United States Patent
Oh et al.

(10) Patent No.: US 10,353,048 B2
(45) Date of Patent: Jul. 16, 2019

(54) APPARATUS AND METHOD FOR LOCATION ESTIMATION IN A WIRELESS COMMUNICATION SYSTEM

(71) Applicant: Samsung Electronics Co., Ltd, Gyeonggi-do (KR)

(72) Inventors: Jong-Ho Oh, Gyeonggi-do (KR); Jung-Min Yoon, Seoul (KR); Sang-Hyun Chang, Seoul (KR); Sung-Rok Yoon, Seoul (KR); Ohyun Jo, Seoul (KR); Chang-Yeul Kwon, Gyeonggi-do (KR); Kil-Sik Ha, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 243 days.

(21) Appl. No.: 15/035,195

(22) PCT Filed: Nov. 3, 2014

(86) PCT No.: PCT/KR2014/010450
§ 371 (c)(1),
(2) Date: May 6, 2016

(87) PCT Pub. No.: WO2015/068993
PCT Pub. Date: May 14, 2015

(65) Prior Publication Data
US 2016/0274229 A1    Sep. 22, 2016

(30) Foreign Application Priority Data

Nov. 6, 2013 (KR) .......................... 10-2013-0133916
May 13, 2014 (KR) .......................... 10-2014-0057396

(51) Int. Cl.
*H04B 7/00*    (2006.01)
*G01S 5/14*    (2006.01)
(Continued)

(52) U.S. Cl.
CPC .............. *G01S 5/14* (2013.01); *G01S 19/24* (2013.01); *G01S 13/765* (2013.01); *G01S 19/14* (2013.01); *G01S 19/25* (2013.01)

(58) Field of Classification Search
CPC .......... G01S 19/14; G01S 19/24; G01S 19/25; G01S 5/14; G01S 11/10; G01S 13/765
(Continued)

(56) References Cited

U.S. PATENT DOCUMENTS 5,952,969 A    9/1999  Hagerman et al.
6,246,376 B1 *  6/2001  Bork ...................... G01S 1/047
                                             342/357.34
(Continued)

FOREIGN PATENT DOCUMENTS

CA        2570029 A1    12/2005
DE   102007031129 A1     1/2009
(Continued)

OTHER PUBLICATIONS

Supplementary European Search Report dated Jun. 30, 2017 in connection with European Patent Application No. 14 85 9677.
(Continued)

*Primary Examiner* — Chuong P Nguyen

(57) ABSTRACT

The present disclosure relates to a sensor network, Machine Type Communication (MTC), Machine-to-Machine (M2M) communication, and technology for Internet of Things (IoT). The present disclosure may be applied to intelligent services based on the above technologies, such as smart home, smart building, smart city, smart car, connected car, health care, digital education, smart retail, security and safety services. Embodiments of the present invention provide a device and a method for estimating a position between wireless apparatuses using a signal transmitted and received between wireless apparatuses in a wireless communication system. A
(Continued)

device of a first wireless apparatus for estimating a position comprises: a transceiver for transmitting and receiving a signal to and from a second wireless apparatus; and a position estimator for estimating a position of the second wireless apparatus using a signal transmitted and received through the transceiver. The position estimator comprises a range estimator for estimating the distance between the first wireless apparatus and the second wireless apparatus on the basis of a first time difference from a time point at which a request range packet is transmitted to the second wireless apparatus to a time point at which the reception of a response range packet transmitted from the second wireless apparatus is sensed and a second time difference from a time point at which the reception of the required range packet is sensed by the second wireless apparatus to a time point at which the response range packet is transmitted.

20 Claims, 21 Drawing Sheets

(51) Int. Cl.
  *G01S 19/24* (2010.01)
  *G01S 19/14* (2010.01)
  *G01S 19/25* (2010.01)
  *G01S 13/76* (2006.01)

(58) Field of Classification Search
  USPC .................. 342/358, 367, 357.64, 357.71
  See application file for complete search history.

(56) References Cited

U.S. PATENT DOCUMENTS

| | | | |
|---|---|---|---|
| 6,876,326 B2* | 4/2005 | Martorana | G01S 1/022 342/458 |
| 7,616,965 B2* | 11/2009 | Rudravaram | G01S 5/0289 455/456.1 |
| 7,800,541 B2* | 9/2010 | Moshfeghi | G01S 5/14 342/422 |
| 7,969,963 B2 | 6/2011 | Duan et al. | |
| 8,467,309 B2* | 6/2013 | Chan | G01S 5/14 370/252 |
| 8,843,076 B2* | 9/2014 | Trainin | H04W 24/00 455/67.11 |
| 2010/0157810 A1 | 6/2010 | Oh et al. | |
| 2011/0292820 A1 | 12/2011 | Ekbal et al. | |
| 2014/0113652 A1* | 4/2014 | Maguire | G01S 5/0289 455/456.1 |
| 2015/0264535 A1* | 9/2015 | Mak | H04W 4/043 455/456.1 |
| 2016/0366548 A1* | 12/2016 | Wang | H04W 64/00 |
| 2017/0093600 A1* | 3/2017 | Li | H04L 5/0037 |

FOREIGN PATENT DOCUMENTS

| | | | | |
|---|---|---|---|---|
| JP | 2009-284495 | | 12/2009 | |
| KR | 10-2008-0050981 | | 6/2008 | |
| KR | 10-2009-0043443 | | 5/2009 | |
| KR | 10-2010-0026519 | | 3/2010 | |
| KR | 2010026519 | * | 3/2010 | ............... G01S 5/02 |
| KR | 20100026519 A | | 3/2010 | |
| KR | 10-0974044 B1 | | 8/2010 | |

OTHER PUBLICATIONS

International Search Report dated Jan. 27, 2015 in connection with International Application No. PCT/KR2014/010450; 5 pages.
Written Opinion of the International Searching Authority dated Jan. 27, 2015 in connection with International Application No. PCT/KR2014/010450; 7 pages.

* cited by examiner

| Element ID (10) | Length (20) | Range Capability Information (30) |
|---|---|---|
| 1 | 1 | 2 |

Octets:

DMG RANGE ELEMENT

FIG.5

A: INITIATOR  B: RESPONDER

APPARATUS AND METHOD FOR
LOCATION ESTIMATION IN A WIRELESS
COMMUNICATION SYSTEM

CROSS-REFERENCE TO RELATED
APPLICATION(S)

The present application claims priority under 35 U.S.C. § 365 to International Patent Application No. PCT/KR2014/010450 filed Nov. 3, 2014, entitled "POSITION ESTIMATION DEVICE AND METHOD FOR WIRELESS COMMUNICATION SYSTEM", and, through International Patent Application No. PCT/KR2014/010450, to Korean Patent Application No. 10-2013-0133916 filed Nov. 6, 2013 and Korean Patent Application No. 10-2014-0057396 filed May 13, 2014, each of which are incorporated herein by reference into the present disclosure as if fully set forth herein.

TECHNICAL FIELD OF THE INVENTION

The present invention relates to the transmission and reception of signals between wireless devices in a wireless communication system.

BACKGROUND OF THE INVENTION

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

Recently, with the progress of wireless communication technology, there is an increase in the transmission and reception of signals between wireless devices. Users can transmit and receive various data (e.g., multimedia data, such as moving images, music, photographs, documents, etc.) while transmitting and receiving signals through wireless devices enabling wireless access such as smart phones, and thereby can be provided with various services.

SUMMARY OF THE INVENTION

Technical Problem

Therefore, embodiments of the present invention provide an apparatus and a method for estimating a location of a wireless device by using signals transmitted and received between wireless devices in a wireless communication system.

Also, embodiments of the present invention provide an apparatus and a method for measuring, with high resolution, a distance and a direction between wireless devices by using signals transmitted and received between the wireless devices in a wireless communication system.

Also, embodiments of the present invention provide an apparatus and a method for rapidly measuring a distance and a direction between wireless devices by using signals transmitted and received between the wireless devices in a wireless communication system.

Also, embodiments of the present invention provide an apparatus and a method for providing information on inaccuracy caused by an effect of a multipath channel when a distance between wireless devices is measured by using signals transmitted and received between the wireless devices in a wireless communication system.

Also, embodiments of the present invention provide an apparatus and a method for minimizing power consumption when a distance and a direction between wireless devices are measured by using signals transmitted and received between the wireless devices in a wireless communication system.

Further, embodiments of the present invention provide an apparatus and a method which, in a wireless communication system, estimate a location of a wireless device by using signals transmitted and received between wireless devices and adjust a handover between the wireless devices and power of signals transmitted and received therebetween based on the estimated location.

Solution to Problem

In accordance with an aspect of the present invention, an apparatus of a first wireless device in a wireless communication system is provided. The apparatus includes a transmitter/receiver for transmitting/receiving a signal to/from a second wireless device; and a location estimator that estimates a location of the second wireless device by using a signal transmitted/received by the transmitter/receiver. The location estimator includes a range estimator that estimates a distance between the first wireless device and the second wireless device based on a first time difference between a time point of transmission of a request range packet to the second wireless device and a time point of detection of reception of a response range packet transmitted by the second wireless device, and a second time difference between a time point of detection of reception of the request range packet by the second wireless device and a time point of transmission of the response range packet.

In accordance with another aspect of the present invention, an operating method of a first wireless device in a wireless communication system is provided. The operating method includes transmitting/receiving a signal to/from a second wireless device, by a transmitter/receiver; and estimating a location of the second wireless device by using a signal transmitted/received by the transmitter/receiver. The estimating of the location of the second wireless device includes estimating a distance between the first wireless device and the second wireless device based on a first time difference between a time point of transmission of a request range packet to the second wireless device and a time point of detection of reception of a response range packet transmitted by the second wireless device, and a second time difference between a time point of detection of reception of the request range packet by the second wireless device and a time point of transmission of the response range packet.

Advantageous Effects

Embodiments of the present invention enable distance estimation having a resolution of several centimeters by using the transmission and reception of signals between wireless devices in a wireless communication system. Also, the embodiments of the present invention enable the estimation of the location of a wireless device on the basis of the estimated distance, and enable the adjustment of a handover between wireless devices and power of signals transmitted and received therebetween on the basis of the estimated location. Further, the embodiments of the present invention enable a distance between wireless devices to be rapidly estimated by using a range packet, enable the inaccuracy (reliability) of distance estimation, which may occur due to an effect of a multipath channel, to be provided to a user, and enable the power consumption of the range estimator to be minimized by using signals used in an existing modem.

BRIEF DESCRIPTION OF THE DRAWINGS

For more complete understanding of the present invention and the advantageous effects thereof, the following description will be made with reference to the accompanying drawings, and in these drawings, the same reference numerals denote the same parts.

FIG. 5 is a view illustrating a configuration of a directional multigigabit range element according to an embodiment of the present invention.

DETAILED DESCRIPTION OF THE INVENTION

In this patent specification, FIGS. 1 to 14B used to describe the principles of the present invention are for illustrative purposes only, and should not be construed as limiting the scope of the present invention in any manner. Those having ordinary knowledge in the pertaining field will understand that the principles of the present invention may be implemented even in an optional wireless communication system which is appropriately disposed.

Embodiments of the present invention, which are to be described below, propose an apparatus and a method which, in a wireless communication system, perform distance estimation having a resolution of several centimeters by using the transmission and reception of signals between wireless devices and estimate a location of a wireless device on the basis of the estimated distance. The above-estimated location information may be used to adjust a handover between the wireless devices and power of signals transmitted and received therebetween. Particularly, embodiments of the present invention propose a signal processing method for distance measurement having a high resolution and a signal processing method for rapidly measuring a distance between wireless devices. Also, embodiments of the present invention propose an apparatus that minimizes power consumption while reducing the inaccuracy of distance measurement which may occur due to an effect of a multipath channel.

As an example, in an embodiment of the present invention, a wireless device may be a portable electronic device having a wireless access function, such as a smart phone. As another example, the wireless device may be one of a portable terminal, a mobile phone, a mobile pad, a media player, a tablet computer, a handheld computer, a camera enabling wireless access, a smart television, and a Personal Digital Assistant (PDA). As still another example, the wireless device may be an apparatus implemented by combining two or more functions from among those of the above-described apparatuses.

In an embodiment, a wireless communication system may be a Device-to-Device (D2D) network. In another embodiment, the wireless communication system may be a Local Area Network (LAN). In still another embodiment, the wireless communication system may be a wireless network which supports a group play function between devices.

Figure 1:
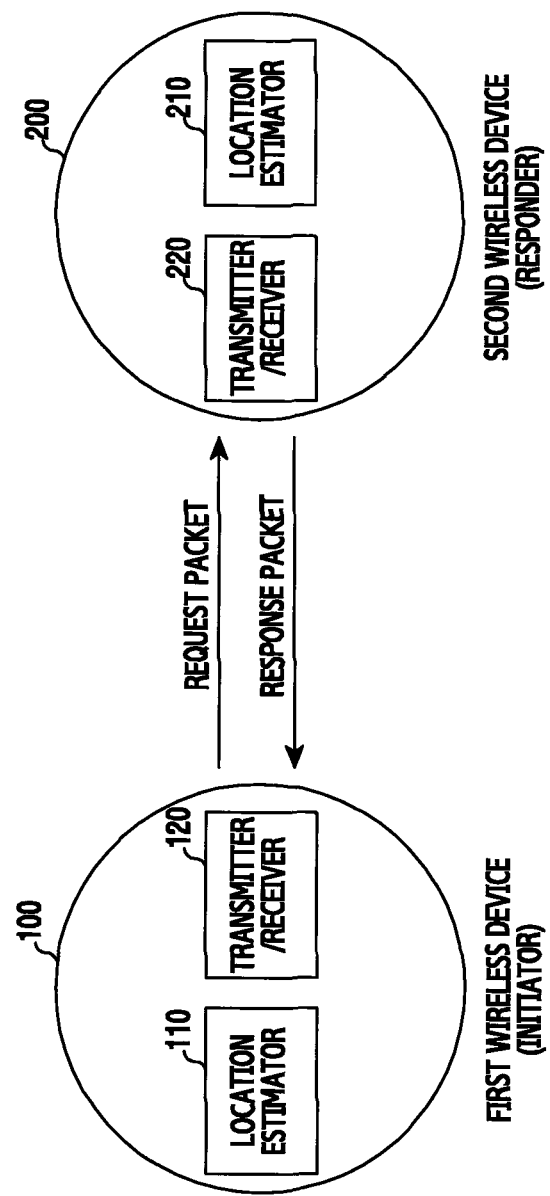
FIG. 1 is a view illustrating a location estimation operation performed between wireless devices according to embodiments of the present invention.

FIG. 1 is a view illustrating a location estimation operation performed between wireless devices according to embodiments of the present invention.

Referring to FIG. 1, a first wireless device 100 is an initiator defined as a wireless device that controls location estimation, and includes a location estimator 110 and a transmitter/receiver 120. A second wireless device 200 is a responder defined as a wireless device that becomes an object of the location estimation, that the first wireless device 100 controls, and includes a location estimator 210 and a transmitter/receiver 220. Hereinafter, an example will be described in which the first wireless device 100 estimates a location (i.e., a distance and a direction) of the second wireless device 200. However, conversely, it goes without saying that the second wireless device 200 may estimate a location (i.e., a distance and a direction) of the first wireless device 100.

The transmitter/receiver 120 transmits, to the second wireless device 200, a request signal (e.g., a request range packet) for location estimation, and receives, from the second wireless device 200, a response signal (e.g., a response range packet) corresponding to the request signal. The transmitter/receiver 220 receives the request signal from the first wireless device 100, and transmits the response signal to the first wireless device 100.

The location estimator 110 estimates a distance and a direction between the first wireless device 100 and the second wireless device 200, and thereby estimates a location of the second wireless device 200. In an embodiment, the location estimator 110 estimates a distance between the first wireless device 100 and the second wireless device 200 on the basis of a first time difference Ti between a time point of transmission of a request range packet and a time point of detection of reception of a response range packet; a second time difference Tr between a time point of detection of reception of the request range packet and a time point of transmission of the response range packet, wherein the second time difference Tr is calculated by the location estimator 210 of the second wireless device 200; and internal circuit delays of the first wireless device 100 and the second wireless device 200.

Also, when estimating the distance between the first wireless device 100 and the second wireless device 200, the location estimator 110 may further consider a transmission circuit delay, a reception circuit delay, and a processing delay for estimating the detection of reception of a range packet in each of the first wireless device 100 and the second wireless device 200. Also, when the distance between the first wireless device 100 and the second wireless device 200 is estimated, the location estimator 110 and the location estimator 210 may further consider a predefined Sample Timing Offset (STO).

In an embodiment, the transmission circuit delay in each of the first wireless device 100 and the second wireless device 200 may include a delay between a Digital to Analog Converter (DAC) and an antenna that are included in each transmitter. In an embodiment, the reception circuit delay in each of the first wireless device 100 and the second wireless device 200 may include a delay between an antenna and an Analog to Digital Converter (ADC) that are included in each receiver. In an embodiment, the processing delay for estimating the detection of the reception of the range packet in each of the first wireless device 100 and the second wireless device 200 may include a delay between the ADC and a range estimator that are included in each receiver.

Figure 2:
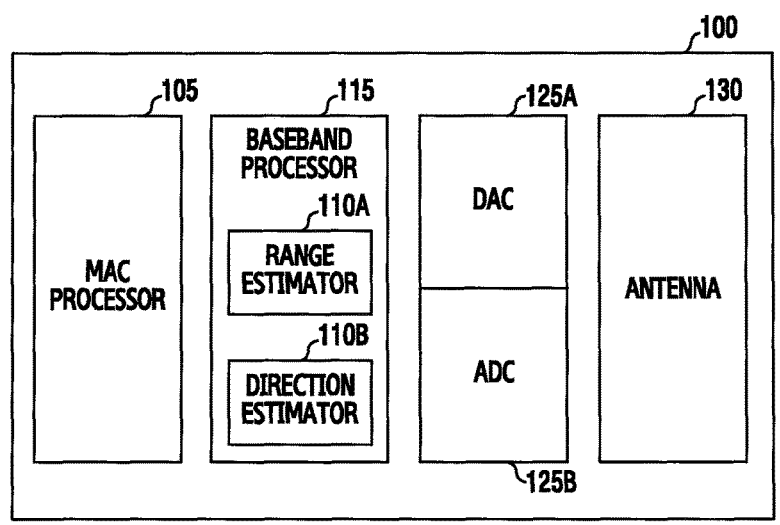
FIG. 2 is a view illustrating a configuration of a first wireless device according to an embodiment of the present invention.

FIG. 2 is a view illustrating a configuration of the first wireless device 100 according to an embodiment of the present invention. The configuration illustrated in FIG. 2, which is only an example for describing the present invention, may be replaced by various modified configurations, and thus should not be construed as limiting the protection scope of the present invention.

Referring to FIG. 2, the first wireless device 100 includes a Medium Access Control (MAC) processor 105, a baseband processor 115, a DAC 125A, an ADC 125B, and an antenna 130. The baseband processor 115 includes a range estimator 110A and a direction estimator 110B. For example, the MAC processor 105, the DAC 125A, the ADC 125B, and the antenna 130 configure the transmitter/receiver 120 illustrated in FIG. 1.

The MAC processor 105 generates information for distance estimation and direction estimation. For example, for distance estimation, the MAC processor 105 generates a range start signal during a range estimation period. As another example, for distance estimation, during a capability negotiation period, the MAC processor 105 generates a Directional Multigigabit (DMG) beacon, a probe request, a probe response, and information request or information response, each of which includes a DMG range element. The baseband processor 115 receives, as input, information generated by the MAC processor 105, and processes the information in a baseband. For example, the baseband processor 115 receives and processes a range start signal, and then generates a request range packet. The DAC 125A converts a digital signal, which has been provided by the baseband processor 115, into an analog signal. The antenna 130 transmits the converted analog signal, which has been provided by the DAC 125A, to the second wireless device 200.

The antenna 130 receives a signal from the second wireless device 200. The ADC 125B converts the analog signal from the second wireless device 200, which has been received through the antenna 130, into a digital signal. The baseband processor 115 processes the converted digital signal, which has been provided by the ADC 125B, in a baseband. For example, the baseband processor 115 processes the received response range packet and outputs the processed response range packet to the MAC processor 105.

The range estimator 110A estimates a distance between the first wireless device 100 and the second wireless device 200. In an embodiment, the range estimator 110A estimates a distance between the first wireless device 100 and the second wireless device 200 on the basis of a first time difference Ti between a time point of transmission of a request range packet and a time point of detection of reception of a response range packet; a second time difference Tr between a time point of detection of reception of the request range packet and a time point of transmission of the response range packet, wherein the second time difference Tr is calculated by the range estimator 210A of the second wireless device 200; and internal circuit delays of the first wireless device 100 and the second wireless device 200. When estimating the distance between the first wireless device 100 and the second wireless device 200, the range estimator 110A may further consider a DAC delay A, a transmission circuit delay B, a reception circuit delay D, an ADC delay E, and a processing delay F for estimating the detection of reception of a request range packet or a response range packet in each of the first wireless device 100 and the second wireless device 200. Also, when estimating the distance between the first wireless device 100 and the second wireless device 200, the range estimator 110A may further consider a predefined STO.

The direction estimator 110B transmits, to the second wireless device 200, a request signal for estimating a direction of the second wireless device 200, and receives the direction estimation from the second wireless device 200 as a response signal and estimates a direction of the second wireless device 200. In an embodiment, the direction estimator 110B measures a strength of a signal transmitted/received between the first wireless device 100 and the second wireless device 200 in one or more beam directions, and estimates direction information of the second wireless device 200 on the basis of the measured strength of the signal. Here, an example is described in which the direction estimator 110B of the first wireless device 100 estimates the direction of the second wireless device 200.

Figure 3:
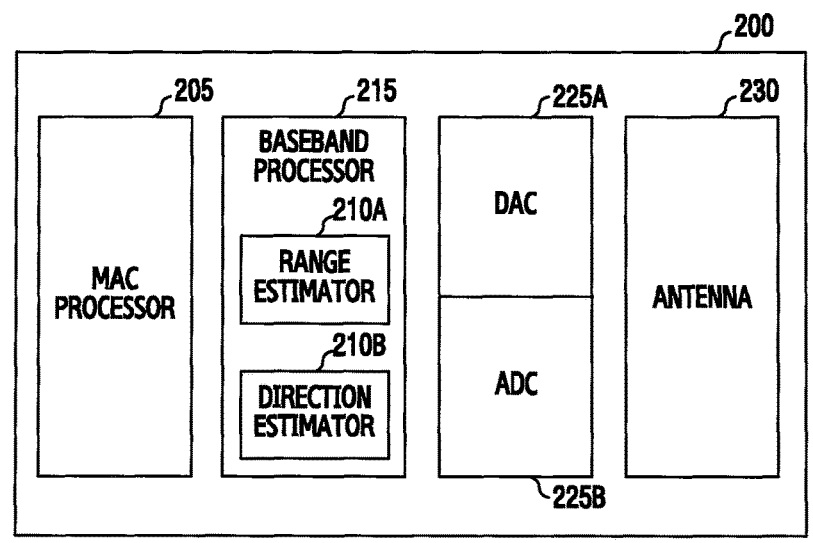
FIG. 3 is a view illustrating a configuration of a second wireless device according to an embodiment of the present invention.

FIG. 3 is a view illustrating a configuration of the second wireless device 200 according to an embodiment of the present invention. The configuration illustrated in FIG. 3, which is only an example for describing the present invention, may be replaced by various modified configurations, and thus should not be construed as limiting the protection scope of the present invention.

Referring to FIG. 3, the second wireless device 200 includes a Medium Access Control (MAC) processor 205, a baseband processor 215, a DAC 225A, an ADC 225B, and an antenna 230. The baseband processor 215 includes a range estimator 210A and a direction estimator 210B. For example, the MAC processor 205, the DAC 225A, the ADC 225B, and the antenna 230 form the transmitter/receiver 220 illustrated in FIG. 1.

The antenna 230 receives a signal from the first wireless device 100. For example, the antenna 230 receives a signal for location estimation, namely, a request range packet for distance estimation and a signal for direction estimation, from the first wireless device 100. The ADC 225B converts the analog signal from the first wireless device 100, which has been received through the antenna 230, into a digital signal. The baseband processor 215 processes the converted digital signal, which has been provided by the ADC 225B, in a baseband. For example, the baseband processor 215 processes the received request range packet and outputs the processed response range packet to the MAC processor 205.

The MAC processor 205 receives information for distance estimation and direction estimation. For example, for distance estimation, the MAC processor 205 receives, from the baseband processor 215, a DMG beacon, a probe request, a probe response, and an information request or an information response, each of which includes a DMG range element.

Also, the MAC processor 205 generates response information for distance estimation. For example, for distance estimation, the MAC processor 205 generates a DMG beacon, a probe request, a probe response, and an information request or an information response, each of which includes a DMG range element corresponding to the received DMG range element.

The baseband processor 215 receives, as input, information generated by the MAC processor 205, and processes the information in a baseband. For example, for distance estimation, the baseband processor 215 generates a response range packet corresponding to the received request range packet. The DAC 225A converts a digital signal, which has been provided by the baseband processor 215, into an analog signal. The antenna 230 transmits the analog signal, which has been provided by the DAC 225A, to the first wireless device 100.

The range estimator 210A calculates a second time difference Tr between a time point of detection of reception of the received request range packet and a time point of transmission of a response range packet. Information on the above-calculated second time difference Tr is transmitted to the first wireless device 100 and is used when the range estimator 110A performs distance estimation.

For direction estimation, the direction estimator 210B receives a signal transmitted by the first wireless device 100, and transmits, to the first wireless device 100, a response signal to the received signal. Here, an example is described in which the direction estimator 110B of the first wireless device 100 estimates a direction of the second wireless device 200. However, in an identical scheme, the direction estimator 210B of the second wireless device 200 may estimate a direction of the first wireless device 100.

Figure 4A:
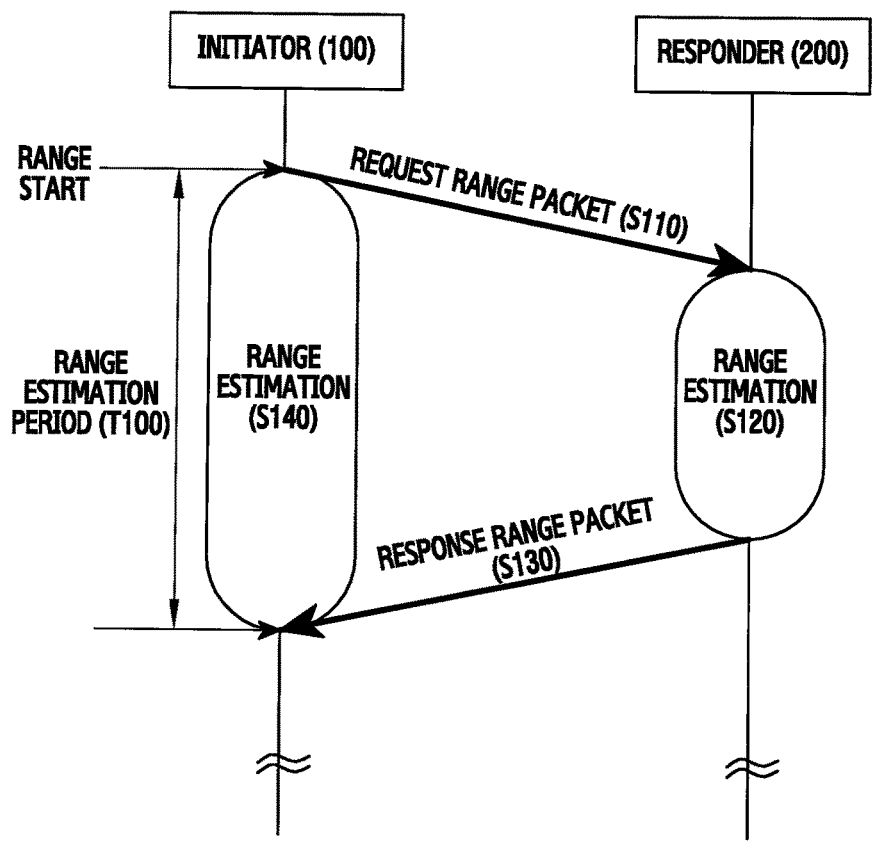
FIGS. 4A, 4B, 4C, and 4D are views each illustrating a processing flow of a distance estimation operation performed by a wireless device according to embodiments of the present invention.
Figure 4B:
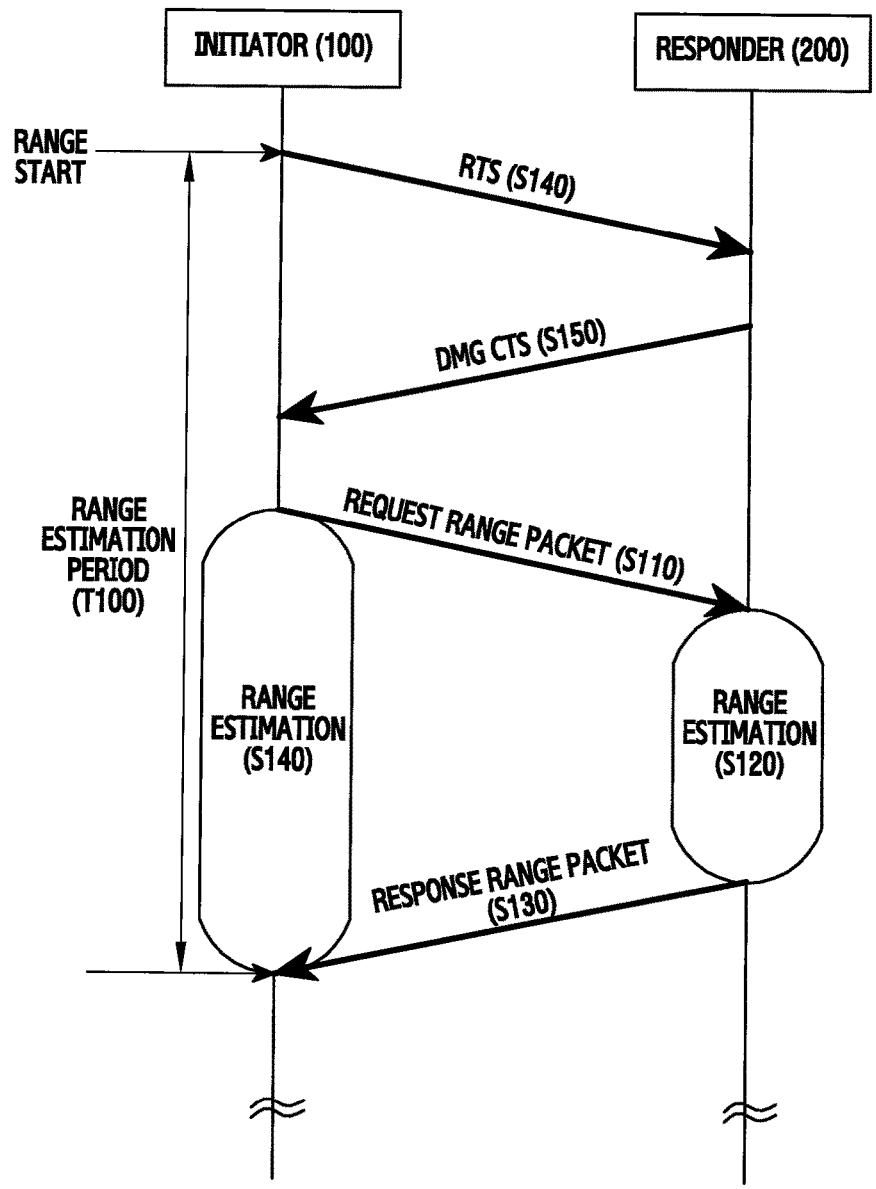
Figure 4C:
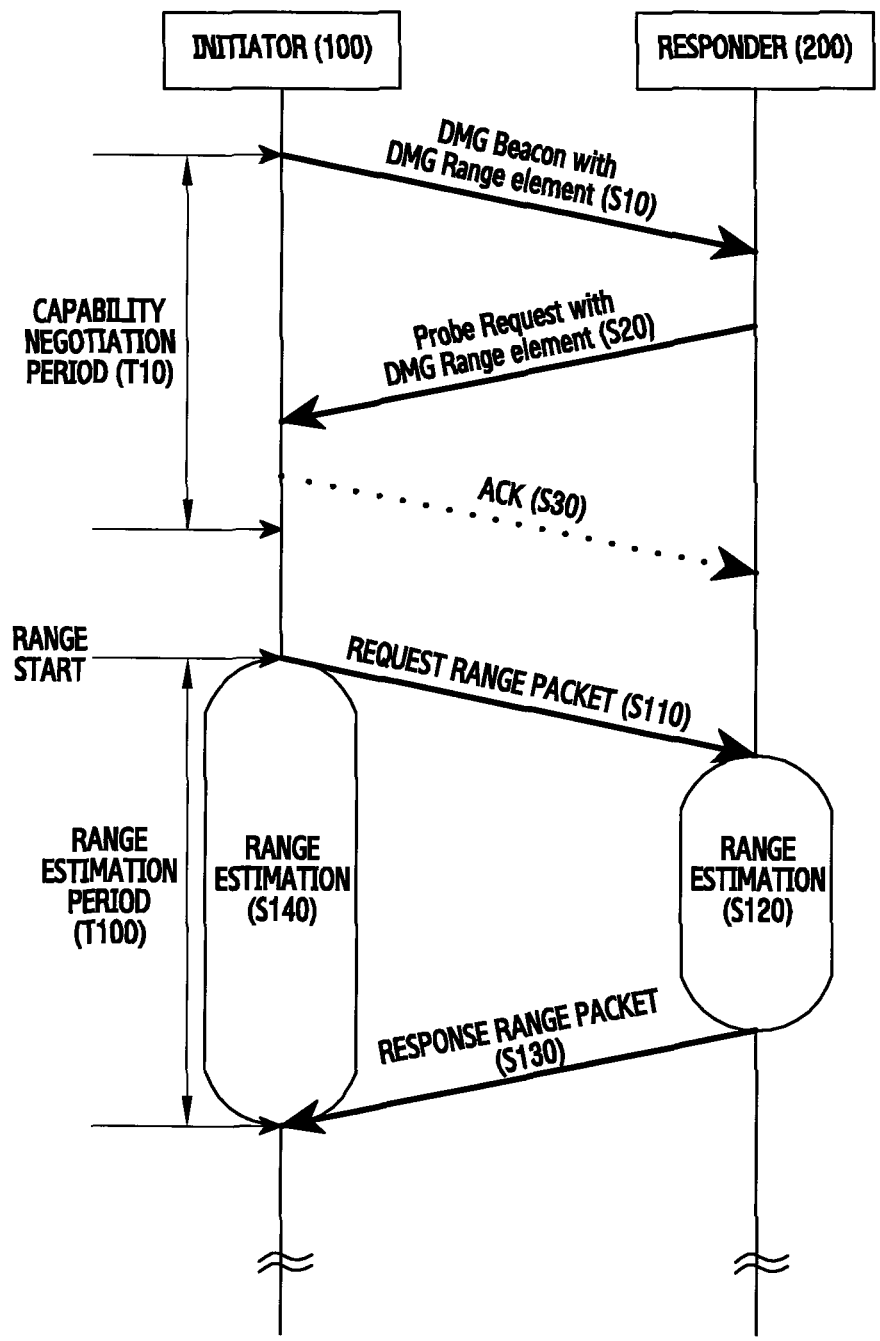
Figure 4D:
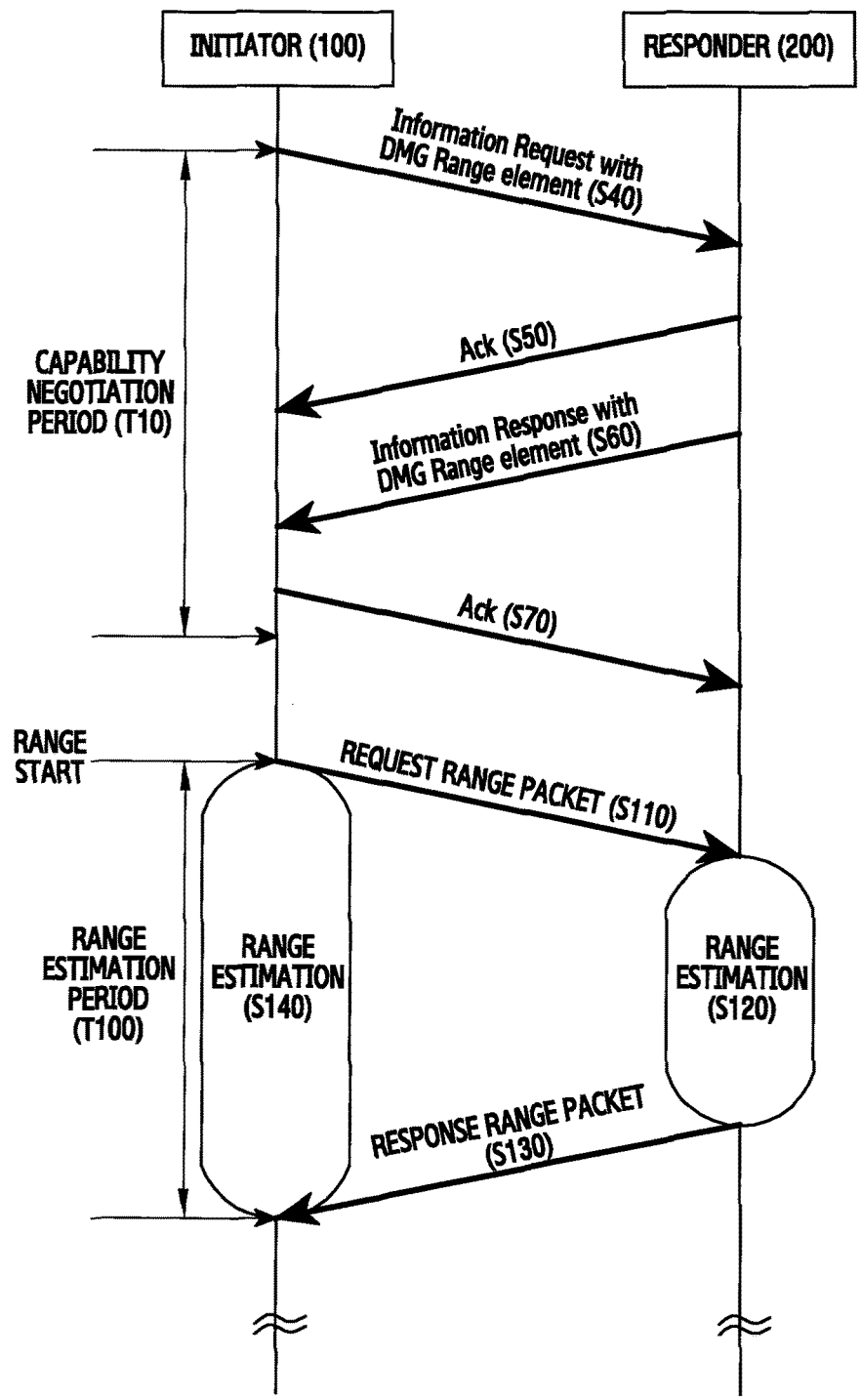

FIGS. 4A, 4B, 4C, and 4D are views each illustrating a processing flow of a distance measurement operation performed by a wireless device according to embodiments of the present invention. The flows illustrated in FIGS. 4A, 4B, 4C, and 4D, which are only examples for describing the present invention, may be replaced by various modified flows, and thus should not be construed as limiting the protection scope of the present invention. FIGS. 4A and 4B each illustrate a processing flow of a distance measurement operation performed by the wireless device according to an embodiment of the present invention, and in each of FIGS. 4A and 4B, one period, namely, a range estimation period T100 during which a distance is measured, is included. FIGS. 4C and 4D each illustrate a processing flow of a distance measurement operation performed by the wireless device according to another embodiment of the present invention, and in each of FIGS. 4C and 4D, two periods, namely, a capability negotiation period T10 during which capabilities enabling distance measurement are interchanged, and a range estimation period T100 during which a distance is measured, are included. At this time, it should be noted that as illustrated in FIGS. 4A and 4B, the range estimation period T100 may be performed without performing the capability measurement period T10. Here, the first wireless device 100 and the second wireless device 200 illustrated in FIG. 1 are referred to as the "initiator 100" and the "responder 200," respectively.

Referring to FIG. 4A, the initiator 100 transmits a request range packet to the responder 200 on the basis of a range start signal in step S110, and the responder 200, that has received the request range packet, transmits a response range packet to the initiator 100 in step S130. This method may be used when a packet having destination information data is used as the request range packet. At this time, the initiator 100 performs range estimation in step S140, and the responder 200 performs range estimation in step S120.

Referring to FIG. 4B, the initiator 100 transmits a Request To Send (RTS) signal to the responder 200 on the basis of a range start signal in step S140, and the responder 200, that has received the RTS signal, confirms that a destination of a request range packet, that the initiator 100 is to transmit, is the responder 200 while transmitting a DMG Clear To Send (CTS) signal to the initiator 100 in step S150. This method may be used when a Null Data Packet (NDP) illustrated in FIG. 7 below is used as the request range packet.

Then, the initiator 100 transmits the request range packet to the confirmed destination responder 200 in step S110, and the responder 200, that has received the request range packet, transmits a response range packet to the initiator 100 in step S130. At this time, the initiator 100 performs range estimation in step S140, and the responder 200 performs range estimation in step S120.

Referring to FIGS. 4C and 4D, in a distance measurement operation, a period is divided into the capability negotiation period T10 during which the initiator 100 and the responder 200 interchange capabilities enabling distance measurement, and the range estimation period T100 during which a distance is measured.

Since the flow illustrated in each of FIGS. 4C and 4D includes a processing flow identical to that of FIG. 4A, hereinafter, the distance measurement operation will be described with reference to only the capability negotiation period T10 additionally included in each of FIGS. 4C and 4D. Referring to FIGS. 4C and 4D, during the capability negotiation period T10, the initiator 100 and the responder 200 exchange respective distance measurement capabilities. For example, the initiator 100 and the responder 200 exchange the respective distance measurement capabilities through a DMG beacon, a probe request, a probe response, and an information request or an information response, each of which includes a DMG range element, which are defined in FIG. 5 below.

FIG. 5 is a view illustrating a configuration of a DMG range element according to an embodiment of the present invention. The configuration illustrated in FIG. 5, which is only an example for describing the present invention, may be replaced by various modified configurations, and thus should not be construed as limiting the protection scope of the present invention.

Referring to FIG. 5, a DMG range element includes an element IDentifier (ID) field 10, a length field 20, and a range capability information field 30. For example, the element ID field 10, the length field 20, and the range capability information field 30 may include one octet, one octet, and two octets, respectively. The DMG range element may be included in a DMG beacon, a probe request, a probe response, and an information request or an information response, and may be defined as an element advertizing range capability. As another example, the DMG range element may also be defined as an element advertizing range capability in an association request/response, a reassociation request/response, and the like.

Figure 6:
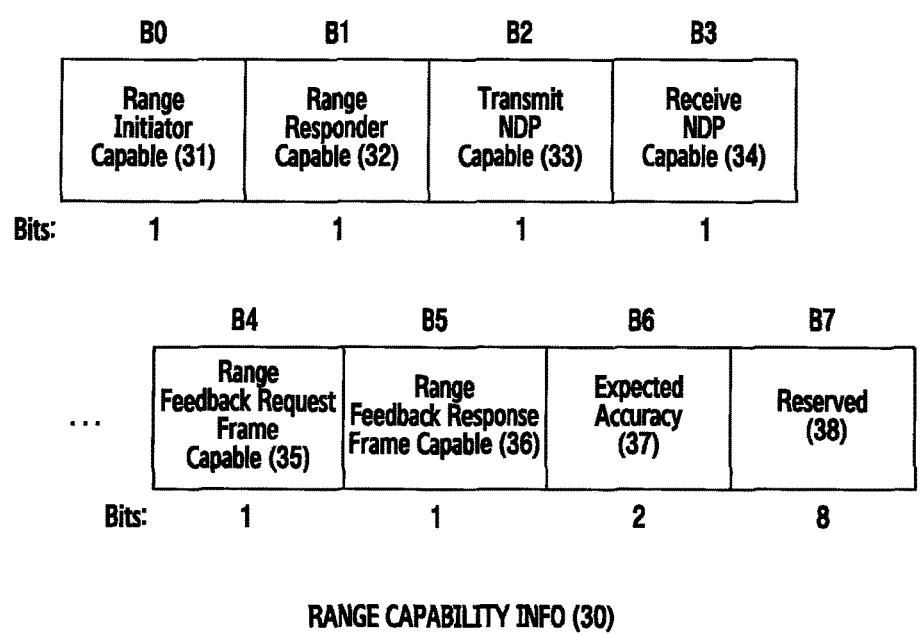
FIG. 6 is a view illustrating a configuration of range capability information field according to an embodiment of the present invention.

FIG. 6 is a view illustrating a configuration of range capability information field according to an embodiment of the present invention. For example, the range capability information field may be the range capability information field 30 illustrated in FIG. 5. The configuration illustrated in FIG. 6, which is only an example for describing the present invention, may be replaced by various modified configurations, and thus should not be construed as limiting the protection scope of the present invention.

Referring to FIG. 6, the range capability information field 30 illustrated in FIG. 5 includes a range initiator capable subfield 31, a range responder capable subfield 32, a transmit NDP capable subfield 33, a receive NDP capable subfield 34, a range feedback request frame capable subfield 35, a range feedback response frame capable subfield 36, an expected accuracy subfield 37, and a reserved subfield 38 for an additional operation. In an embodiment, each of the range initiator capable subfield 31, the range responder capable subfield 32, the transmit NDP capable subfield 33, the receive NDP capable subfield 34, the range feedback request frame capable subfield 35, and the range feedback response frame capable subfield 36 may include one bit. The expected accuracy subfield 37 may include two bits. The reserved subfield 38 may include eight bits. The definition and encoding of each subfield may be defined in Table 1 below.

TABLE 1

| Subfield | Definition | Encoding |
|---|---|---|
| Range initiator capable | whether STA is capable of operating as initiator | 0: impossible<br>1: possible |
| Range responder capable | whether STA is capable of operating as responder | 0: impossible<br>1: possible |
| Transmit NDP capable | whether STA is capable of transmitting NDP | 0: impossible<br>1: possible |
| Receive NDP capable | whether STA is capable of receiving NDP | 0: impossible<br>1: possible |
| Range feedback request frame capable | whether STA is capable of using range feedback request frame | 0: impossible<br>1: possible |
| Range feedback response frame capable | whether STA is capable of using range feedback response frame | 0: impossible<br>1: possible |
| Expected accuracy | expected accuracy of distance measurement | 0: not support<br>1: 1 cm<br>2: 10 cm<br>3: 1 m |

For example, a case where the value of the range initiator capable subfield 31 is equal to 0 indicates that a wireless device or a STAtion (STA) is not capable of operating as an initiator for distance measurement. A case where the value of the range initiator capable subfield 31 is equal to 1 indicates that the wireless device or the STA is capable of operating as the initiator for distance measurement. A case where the value of the range responder capable subfield 32 is equal to 0 indicates that the wireless device is not capable of operating as a responder for distance measurement. A case where the value of the range responder capable subfield 32 is equal to 1 indicates that the wireless device is capable of operating as the responder for distance measurement. A case where the value of the transmit NDP capable subfield 33 is equal to 1 indicates that the wireless device is capable of transmitting an NDP. A case where the value of the transmit NDP capable subfield 33 is equal to 0 indicates that the wireless device is not capable of transmitting an NDP. A case where the value of the receive NDP capable subfield 34 is equal to 1 indicates that the wireless device is capable of receiving an NDP. A case where the value of the receive NDP capable subfield 34 is equal to 0 indicates that the wireless device is not capable of receiving an NDP. A case where the value of the range feedback request frame capable subfield 35 is equal to 1 indicates that the wireless device is capable of using a range feedback request frame. A case where the value of the range feedback request frame capable subfield 35 is equal to 0 indicates that the wireless device is not capable of using the range feedback request frame. A case where the value of the range feedback response frame capable subfield 36 is equal to 1 indicates that the wireless device is capable of using a range feedback response frame. A case where the value of the range feedback response frame capable subfield 36 is equal to 0 indicates that the wireless device is not capable of using the range feedback response frame. A case where the value of the expected accuracy subfield 37 is equal to 1 indicates that the expected accuracy of distance measurement, that the wireless device is capable of providing, is 1 cm. A case where the value of the expected accuracy subfield 37 is equal to 2 indicates that the expected accuracy of distance measurement, that the wireless device is capable of providing, is 10 cm. A case where the value of the expected accuracy subfield 37 is equal to 3 indicates that the expected accuracy of distance measurement, that the wireless device is capable of providing, is 1 m. A case where the value of the expected accuracy subfield 37 is equal to 0 indicates that the wireless device does not support distance measurement.

Referring back to FIG. 4C, while exchanging a DMG beacon and a probe request signal for scanning during the capability negotiation period T10, through a range capability information field within a DMG range element, the first wireless device 100 as the initiator and the second wireless device 200 as the responder interchange whether an STA is capable of operating as an initiator/responder, whether the STA is capable of receiving/transmitting an NDP, and whether the STA is capable of using a range feedback request/response frame.

In step S10, the initiator 100 includes a DMG range element including capability information thereof in a DMG beacon, and transmits the DMG beacon including the DMG range element to the responder 200. In step S20, in response to the reception of the DMG beacon including the DMG range element, the responder 200 transmits a probe request including a DMG range element to the initiator 100. In step S30, in response to the reception of the probe request including the DMG range element, the initiator 100 may transmit an ACKnowledgement (ACK) signal to the responder 200.

Referring to FIG. 4D, while exchanging an information request signal and an information response signal during the capability negotiation period T10, through a range capability information field within a DMG range element, the first wireless device 100 as the initiator and the second wireless device 200 as the responder interchange whether an STA is capable of operating as an initiator/responder, whether the STA is capable of receiving/transmitting an NDP, and whether the STA is capable of using a range feedback request/response frame.

In step S40, the initiator 100 includes a DMG range element including capability information thereof in an information request, and transmits the information request including the DMG range element to the responder 200. In step S50, in response to the reception of the information request including the DMG range element, the responder 200 transmits an ACK to the initiator 100. In step S60, in response to the reception of the information request including the DMG range element, the responder 200 transmits an information response including a DMG range element to the initiator 100. In step S70, in response to the reception of the information response including the DMG range element, the initiator 100 transmits an ACK to the responder 200.

The initiator 100 and the responder 200 may interchange the respective pieces of capability information during the capability negotiation period T10 as described above, and thus, may rapidly enter the range estimation period T100 appropriately for the capabilities of the initiator 100 and the responder 200 without a separate operation.

Figure 7:
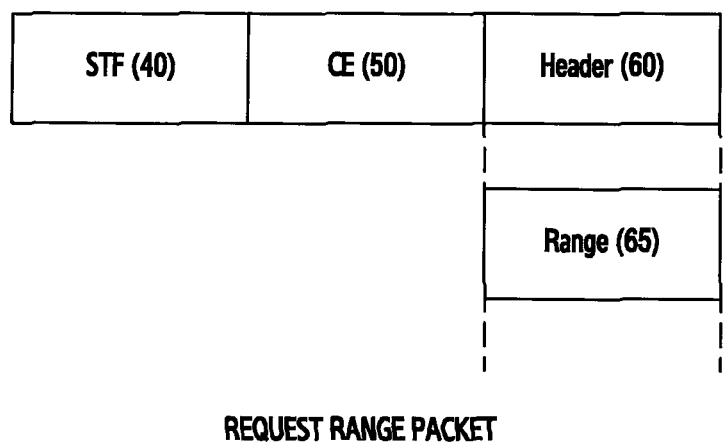
FIG. 7 is a view illustrating a configuration of a request range packet according to embodiments of the present invention.

FIG. 7 is a view illustrating a configuration of a request range packet according to embodiments of the present invention. The configuration illustrated in FIG. 7, which is only an example for describing the present invention, may be replaced by various modified configurations, and thus should not be construed as limiting the protection scope of the present invention.

Referring to FIG. 7, a request range packet is a packet transmitted by an STA (or a wireless device) for the purpose of measuring a distance. The request range packet may have a format illustrated in FIG. 7. The request range packet refers to all packets including only a Short Training Field (STF) 40 and a Channel Estimation (CE) field 50.

Due to an oscillator error between the initiator 100 and the responder 200, it may be difficult for the initiator 100 and the responder 200 to have an accuracy of several centimeters in the case of processing a signal through a packet having a long data length. In this case, for distance measurement having a high-resolution accuracy, it is appropriate to use an NDP which does not have data, including a header 60 illustrated in FIG. 7, as a request range packet.

Meanwhile, since not all wireless devices are capable of transmitting and receiving NDPs, whether an NDP range packet is capable of being used may be determined for each wireless device, according to the range capability information defined in Table 1. Also, although the NDP range packet is not capable of being used, a range field shown in Table 2 below may be placed in the header 60 as illustrated in FIG. 7 and time required to process a signal through a packet having a long data length may be reduced, so that accuracy can be increased.

TABLE 2

| Field | Definition | Encoding |
|---|---|---|
| Range | whether packet is range packet | 0: no range packet<br>1: range packet |

For example, when the header 60 illustrated in FIG. 7 includes a range field 65, if the value of the range field 65 of the header 60 is equal to 1, the value 1 of the range field 65 represents a range packet. If the value of the range field 65 of the header 60 is equal to 0, the value 0 of the range field 65 represents a case where the packet is not a range packet.

Referring back to FIG. 4A, a distance measurement operation is started by a range start signal during the range estimation period T100. The first wireless device 100 as the initiator transmits a request range packet to the second wireless device 200 as the responder in step S110, and the responder 200 transmits a response range packet to the initiator 100 in response to the request range packet in step S130. Step S110 and step S130 correspond to a case where the initiator 100 does not use an NDP but use a packet having data as the request range packet. All packets, which enable the responder 200 to respond after the passage of a preset time interval, for example, a Short Interframe Space (SIFS) interval, may be used as the request range packet. For example, an RTS, a probe response, a request action frame, and the like may be used as request range packets, and at this time, a DMG CTS, an ACK, and a response action frame may be used as response range packets, respectively.

Referring back to FIG. 4B, a distance measurement operation is started by a range start signal during the range estimation period T100. In steps 140 and 150, while exchanging an RTS and a DMG CTS, the first wireless device 100 as the initiator and the second wireless device 200 as the responder confirm that a destination of a request range packet, that the initiator 100 is to request, is the responder 200. In steps 110, the initiator 100 may transmit a NDP as the request range packet to the responder 200. Since the NDP has an ambiguous destination thereof, it is necessary to perform steps S140 and S150. The responder 200 transmits a response range packet to the initiator 100 in response to the NDP. At this time, an ACK or a response action frame may be used as the response range packet in step S130.

Figure 8A:
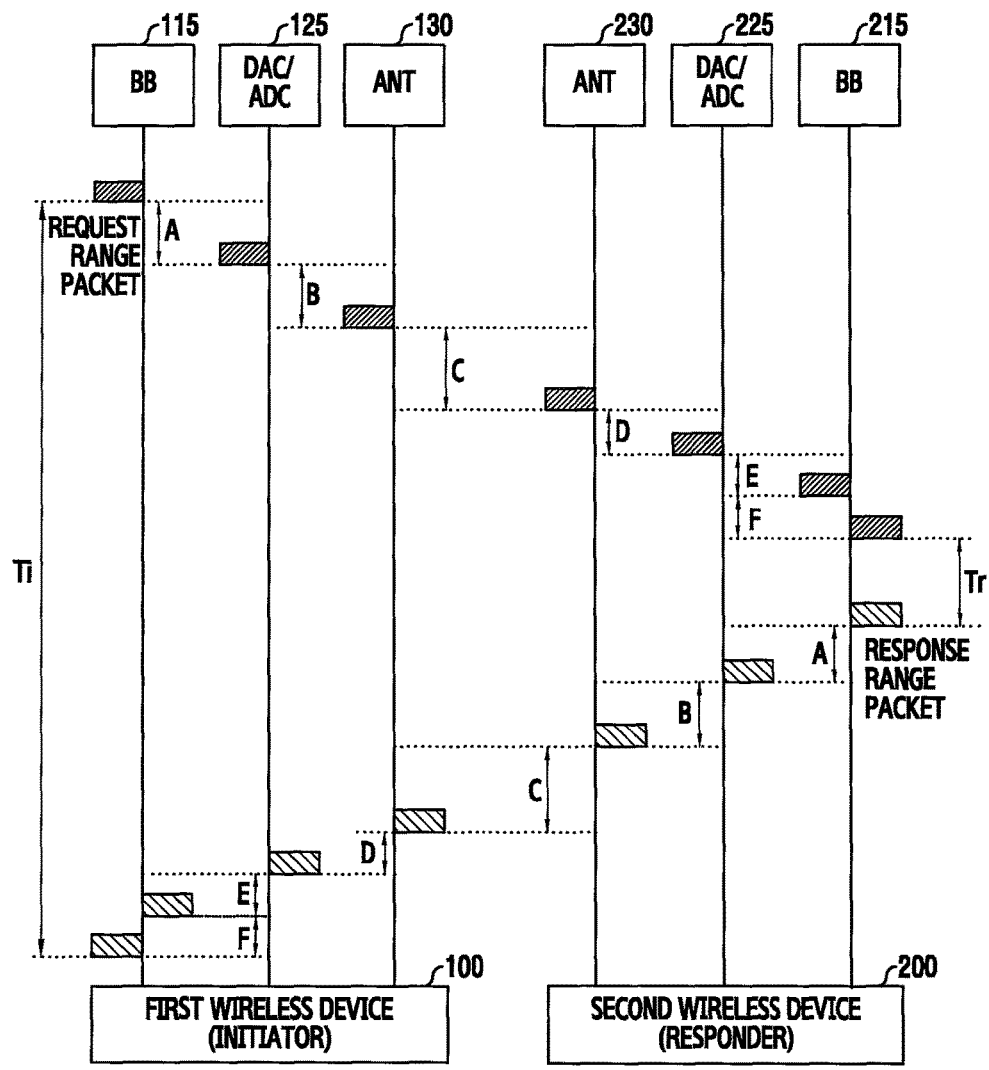
FIGS. 8A and 8B are views each illustrating a distance estimation operation for estimating a distance between wireless devices by a range estimator according to embodiments of the present invention.

FIG. 8A is a view illustrating a distance estimation operation for estimating a distance between wireless devices by a range estimator according to an embodiment of the present invention. The distance estimation operation may be performed by the range estimator 110A illustrated in FIG. 2 and the range estimator 210A illustrated in FIG. 3. The flow illustrated in FIG. 8A, which is only an example for describing the present invention, may be replaced by various modified flows, and thus should not be construed as limiting the protection scope of the present invention.

Referring to FIG. 8A, the range estimator 110A of the first wireless device 100 counts a time period from a time point of transmission of a request range packet through the DAC 125 to a time point of detection of reception of a response range packet received by the baseband processor 115. This time period is Ti. The range estimator 210A of the second wireless device 200 counts a time period from a time point of detection of reception of a request range packet received by the baseband processor 215 to a time point of transmission of a response range packet through the DAC 225. This time period is Tr.

In Table 3 below, A represents each of a delay of the DAC 125A of the initiator 100 and a delay of the DAC 225A of the responder 200. B represents each of a transmit circuit delay between the DAC 125A of the initiator 100 and the antenna 130 thereof, and a transmit circuit delay between the DAC 225A of the responder 200 and the antenna 230 thereof. C represents a propagation delay between the initiator 100 and the responder 200. D represents each of a receive circuit delay between the antenna 230 of the responder 200 and the ADC 225B thereof, and a receive circuit delay between the antenna 130 of the initiator 100 and the ADC 125B thereof. E represents each of a delay of the ADC 225B of the responder 200 and a delay of the ADC 125B of the initiator 100. F represents each of a processing delay of BB of the baseband processor 215 of the responder 200 and a processing delay of BB of the baseband processor 115 of the initiator 100.

TABLE 3

| Symbol | Description |
| --- | --- |
| Ti | Time for Clock Counter of Initiator |
| Tr | Time for Clock Counter of Responder |
| A | DAC Delay |
| B | Transmit Circuit Delay |
| C | Propagation Delay |
| D | Receive Circuit Delay |
| E | ADC Delay |
| F | Processing Delay of BB |

As described above, the first wireless device 100 and the second wireless device 200 may identify F and may also identify A, B, D, and E, and thus, Equations 1 and 2 below may be derived.

$$Ti = Tr + 2(A+B+C+D+E+F) \quad \text{Equation 1}$$

$$C = (Ti-Tr)/2 - (A+B+D+E+F) \quad \text{Equation 2}$$

A propagation delay C may be obtained from Equation 2. At this time, A, B, D, E, and F represent constants, the value of Ti may be calculated by measurement, the value of Tr may be measured by the second wireless device 200 and may be received from the second wireless device 200. Accordingly, the first wireless device 100 may estimate a distance between the first wireless device 100 and the second wireless device 200.

Figure 8B:
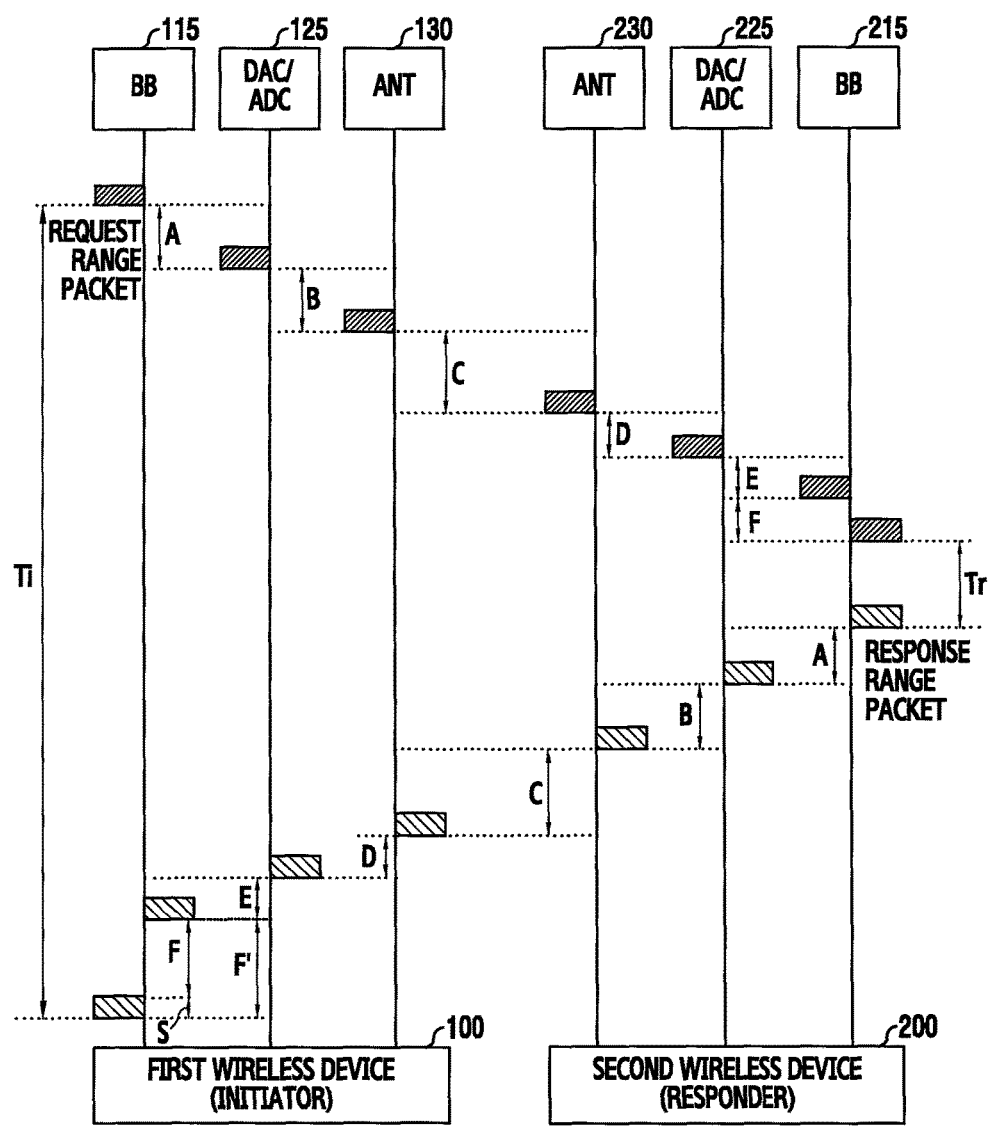

FIG. 8B is a view illustrating a distance estimation operation for estimating a distance between wireless devices by a range estimator according to another embodiment of the present invention. The distance estimation operation may be performed by the range estimator 110A illustrated in FIG. 2 and the range estimator 210A illustrated in FIG. 3. The flow illustrated in FIG. 8B, which is only an example for describing the present invention, may be replaced by various modified flows, and thus should not be construed as limiting the protection scope of the present invention.

When compared with FIG. 8A, in the processing flow illustrated in FIG. 8B, each of the initiator 100 and the responder 200 uses an STO to perform more accurate distance estimation. This is for performing more accurate distance estimation by correcting an error and the like, which may occur when a correlation result value in a unit of sampling a received signal is calculated, as expressed by Equation 3 below.

Figure 9A:
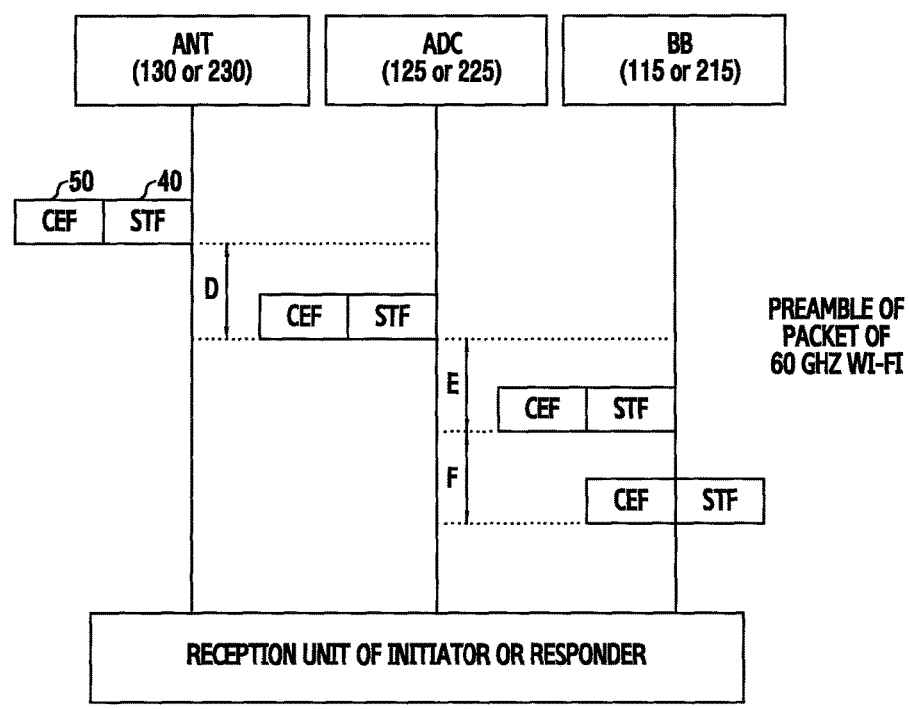
FIGS. 9A to 9C are views for explaining an operation of detecting a received symbol in order to estimate a distance according to embodiments of the present invention.
Figure 9B:
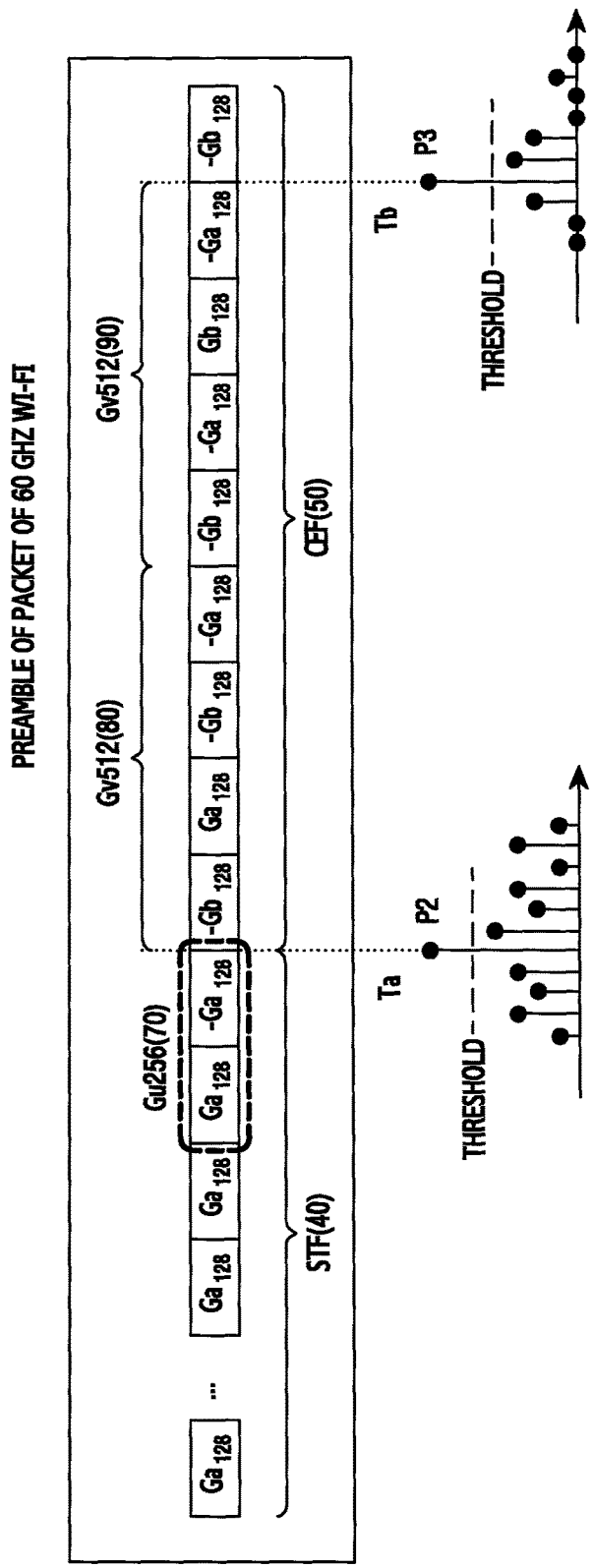
Figure 9C:
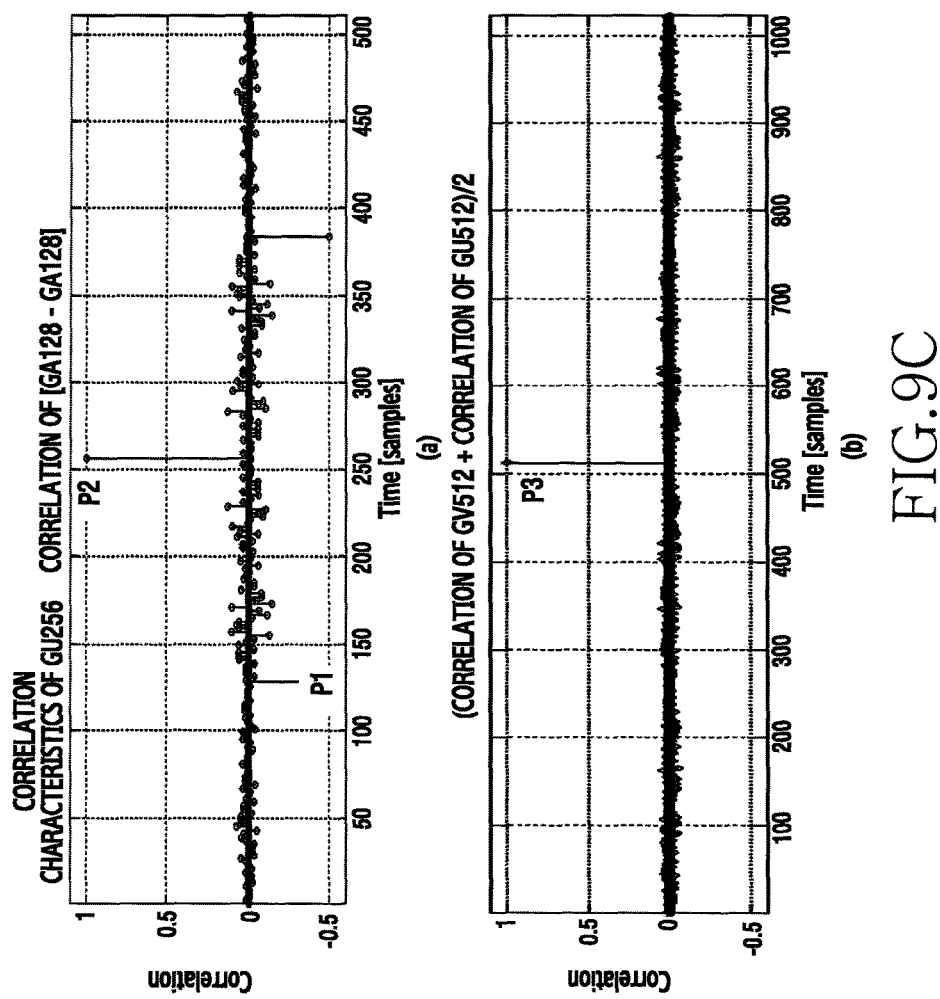

FIGS. 9A to 9C are views for explaining an operation of detecting a received symbol, that wireless devices perform in order to estimate a distance, according to embodiments of the present invention.

Referring to FIG. 9A, each of the first wireless device 100 and the second wireless device 200 detects a received symbol by using a so-called Golay sequence used in a preamble of a packet of 60 GHz Wi-Fi. What is important in distance estimation is to calculate a propagation delay C, and the first wireless device 100 and the second wireless device 200 may not immediately recognize time points of receptions of packets through the antennas 130 and 230, respectively. Accordingly, the baseband processor 115 of the initiator 100 or the baseband processor 215 of the responder 200 performs reception detection estimation, and recognizes the time point of the reception of the packet through the antenna 130 or 230 on the basis of a result of the reception detection estimation. A preamble is received through the antenna 130 or 230 and is delivered to the ADC 125B or 225B (a time delay D), and a start point of the preamble is delivered to the baseband processor 115 or 215 (a time delay E). The baseband processor 115 or 215 may perform reception detection estimation on the basis of a time point of reception of the start point of the preamble by the baseband processor 115 or 215. However, for more accurate reception detection, reception detection estimation may be performed by using characteristics of the Golay sequence of the preamble (a time delay F).

FIGS. 9B and 9C illustrate a reception detection estimation operation related to a Golay sequence used in a preamble of a packet of 60 GHz Wi-Fi and correlation characteristics of the Golay sequence, respectively.

Referring to FIG. 9B, the preamble of the packet of 60 GHz Wi-Fi includes an STF 40 and a CE field 50. The STF 40 and the CE field 50 include a Ga128 and a Gb128 both having a sample length of 128; and a Gu256 70, a Gv512 80, and a Gu512 90, each including a combination of the Ga128 and the Gb128.

Referring to correlation characteristics of the Gu256 70 illustrated in FIG. 9C, a peak P2 may be expected at an end point of the STF 40 as illustrated in FIG. 9B, and reception detection may be performed by comparing P2 with a predetermined threshold. Also, reception detection may be performed by using a phase difference between P1 and P2 of correlation characteristics of the Gv256 80 illustrated in (a) of FIG. 9C. Referring to characteristics of the sum of a correlation of the Gv512 80 and a correlation of the Gu512 90 which are illustrated in (b) of FIG. 9C, a peak P3 may be expected at an end point of the Gu512 90 as illustrated in FIG. 9B, and reception detection may be performed by comparing P3 with a predetermined threshold. Here, although an embodiment is described in which the reception detection estimation operation is performed by using the particular correlation characteristics of the Golay sequence, a similar modified embodiment may be implemented. For example, for a reception detection estimation operation, correlation characteristics of the Ga128 or the Gb128 may be used, or a signal having a good autocorrelation property, for example, a pseudo random code, may be used.

Meanwhile, when the baseband processor 115 of the initiator 100 or the baseband processor 215 of the responder 200 performs reception detection estimation, a unit of measurement is a unit of digital sampling, and thus a reception detection estimation error may exist. In this regard, a more accurate reception detection processing delay F of the baseband processor 215 of the responder 200 and a more accurate reception detection processing delay F of the baseband processor 115 of the initiator 100 may be obtained by utilizing an STO as expressed by Equation 3 below.

$$F' = F + S \quad \text{Equation 3}$$

Here, F represents each of a processing delay of the baseband processor 215 of the responder 200 and a processing delay of the baseband processor 115 of the initiator 100 in a case where reception detection is performed in a unit of sample, and S represents an STO and has a delay shorter than that of one sample.

Figure 10:
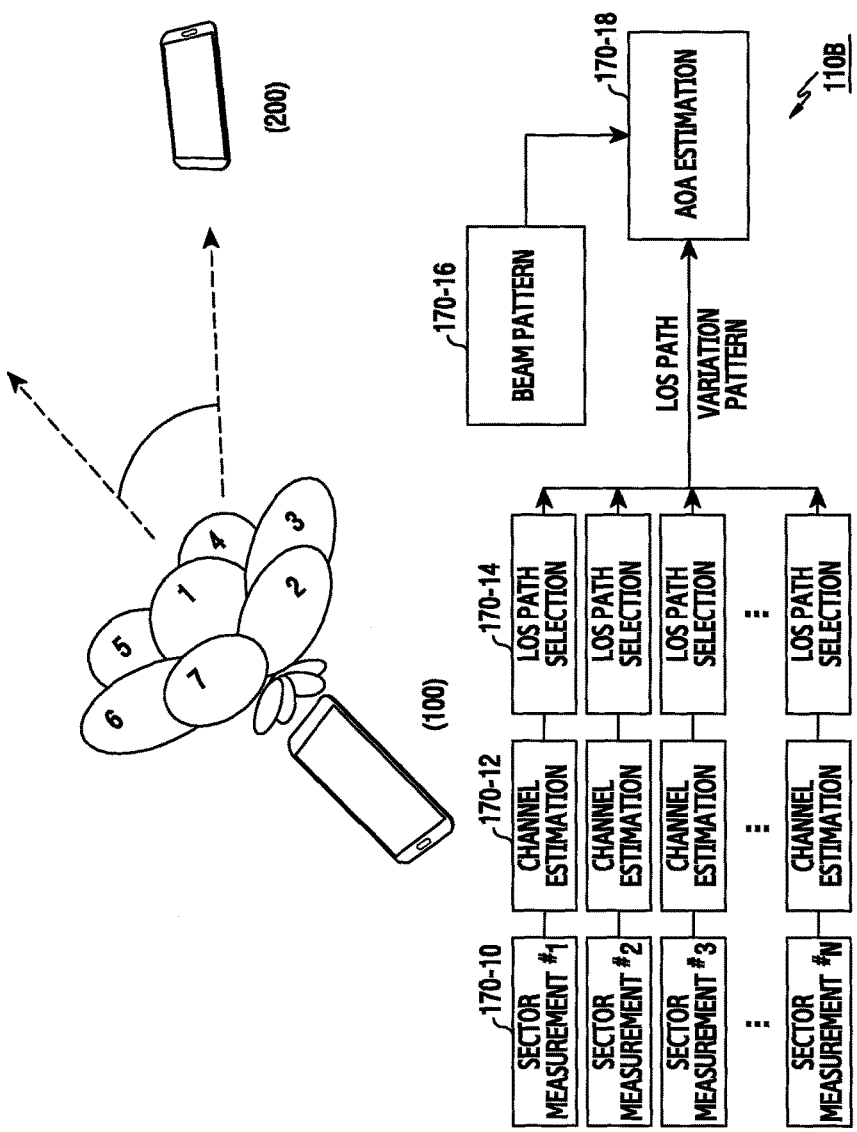
FIGS. 10 and 11 are views for explaining a direction estimation operation according to embodiments of the present invention.
Figure 11:
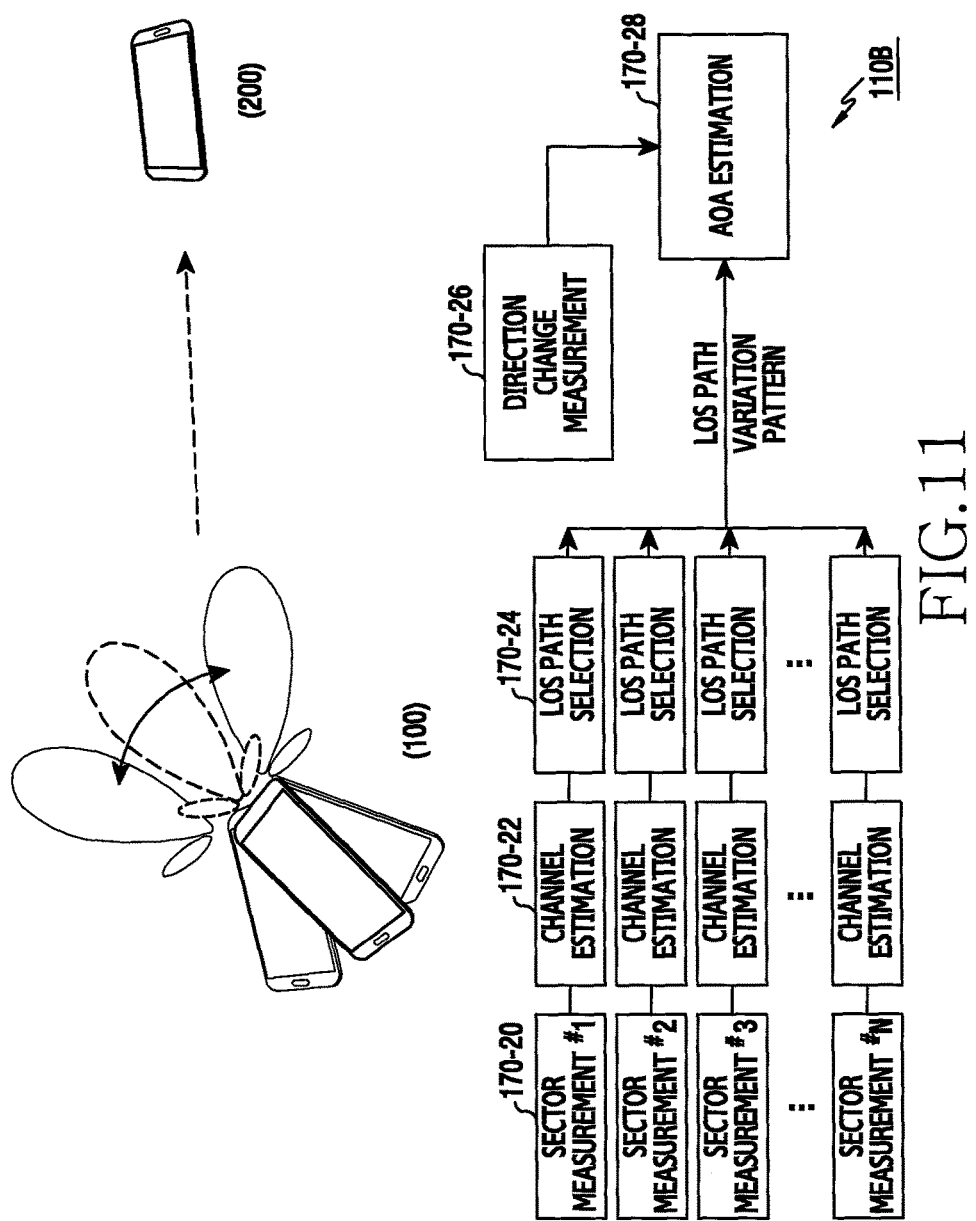

FIGS. 10 and 11 are views for explaining an operation of searching for a direction by the responder 200 according to embodiments of the present invention. The configuration illustrated in FIGS. 10 and 11, which is only an example for describing the present invention, may be replaced by various modified configurations, and thus should not be construed as limiting the protection scope of the present invention. A method for searching for a direction by the responder 200, according to embodiments of the present invention, may be an electric beam-sweep method illustrated in FIG. 10 and a manual beam-sweep method illustrated in FIG. 11. Such a direction estimation operation may be performed by the direction estimator 110B illustrated in FIG. 2. Here, an example is described in which the first wireless device 100 as the initiator estimates a direction of the second wireless device 200 as the responder. However, in an identical scheme, the direction estimator 210B of the second wireless device 200 illustrated in FIG. 3 may estimate a direction of the first wireless device 100.

Referring to FIG. 10, for the electric beam-sweep method, the direction estimator 110B of the initiator 100 includes multiple sector measurement units 170-10, multiple channel estimators 170-12, multiple Line-of-Sight (LOS) path selectors 170-14, a beam pattern storage unit 170-16, and an Angle of Arrival (AOA) estimator 170-18. The multiple sector measurement units 170-10 measure a strength of a signal in a case where the initiator 100 exchanges signals with the reception device while changing an antenna beam direction through antenna beamforming. The multiple channel estimators 170-12 respectively correspond to the multiple sector measurement units 170-10, and estimate respective channels. The multiple LOS path selectors 170-14 respectively correspond to the multiple channel estimators 170-12 and each select a LOS path by searching for a peak of the estimated channel. The AOA estimator 170-18 compares a LOS path variation pattern, which has been output from the multiple LOS path selectors 170-14, with a beam pattern, which is pre-stored in the beam pattern storage unit 170-16, and estimates an AOA according to a result of the comparison. Accordingly, the direction of the responder 200 is estimated.

Referring to FIG. 11, for the manual beam-sweep method, the direction estimator 110B of the initiator 100 includes multiple sector measurement units 170-20, multiple channel estimators 170-22, multiple LOS path selectors 170-24, a direction change measurement unit 170-26, and an AOA estimator 170-28. The multiple sector measurement units 170-20 measure a strength of a signal in a case where the initiator 100 exchanges signals with the reception device while a user changes an antenna beam direction with the user's hand in a state of fixing an antenna beam of the transmission device 100 so as to face the front of the transmission device 100. The multiple channel estimators 170-22 respectively correspond to the multiple sector measurement units 170-20, and estimate respective channels. The multiple LOS path selectors 170-24 respectively correspond to the multiple channel estimators 170-22 and each select a LOS path by searching for a peak of the estimated channel. The AOA estimator 170-28 compares a LOS path variation pattern, which has been output from the multiple LOS path selectors 170-24, with a beam pattern, which has been measured by the direction change measurement unit 170-26 that may be implemented by a gyroscope sensor, and estimates an AOA according to a result of the comparison. Accordingly, the direction of the responder 200 is estimated.

Figure 12:
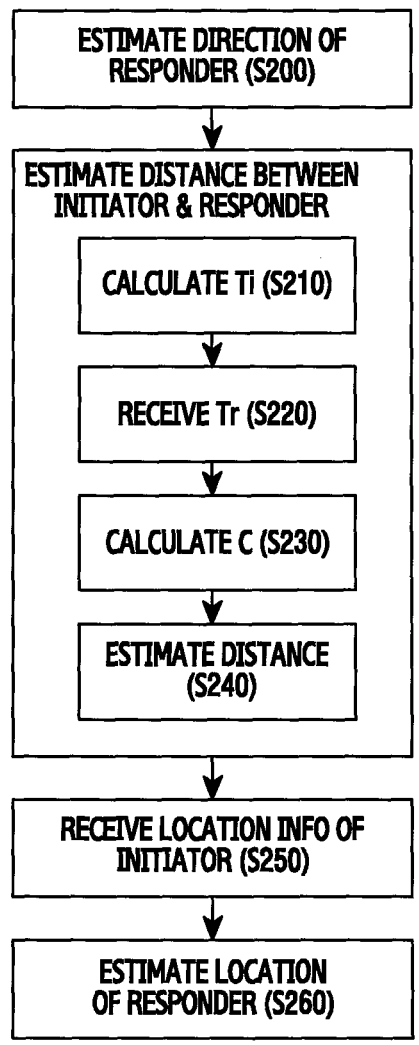
FIG. 12 is a view illustrating a processing flow of a location estimation operation according to an embodiment of the present invention.

FIG. 12 is a view illustrating a processing flow of a location estimation operation performed between wireless devices according to an embodiment of the present invention. The flow illustrated in FIG. 12, which is only an example for describing the present invention, may be replaced by various modified flows, and thus should not be construed as limiting the protection scope of the present invention. The flow may be performed by, for example, the location estimator 110 of the initiator 100 illustrated in FIG. 1. An operation of estimating a distance and a direction of the responder 200 by the initiator 100 may be performed by the range estimator 110A and the direction estimator 110B included in the baseband processor 115 of the initiator 100 illustrated in FIG. 2. A distance estimation operation performed by the range estimator 110A may be performed according to the above-described flows illustrated in FIGS. 4A to 8B. A direction estimation operation performed by the direction estimator 110B may be performed according to the above-described flow illustrated in FIG. 10 or 11.

Referring to FIG. 12, in step S200, the direction estimator 110B of the initiator 100 estimates a direction (i.e., an angle) of the responder 200 in order to estimate a location of the responder 200.

Then, in steps S210 to S240, the initiator 100 estimates a distance between the initiator 100 and the responder 200. To this end, it is necessary to know a time period during which a request range packet and a response range packet are in the air. Specifically, it is necessary to know the propagation delay C defined in Table 3. In order to obtain C, in step S210, the range estimator 110A of the initiator 100 calculates a time period Ti from a time point of generation and transmission of a request range packet to a time point of detection of a response range packet transmitted by the responder 200. In step S220, the range estimator 110A of the initiator 100 receives a time period Tr calculated by the range estimator 210A of the responder 200. In step S230, the range estimator 110A of the initiator 100 calculates the propagation delay C from the calculated Ti and Tr by using Equation 2. In step S240, the range estimator 110A of the initiator 100 applies C, which has been calculated by using Equation 2, to Equation 4 below, and thereby estimates the distance between the initiator 100 and the responder 200.

$$\text{Distance} = C \times (\text{Speed of light}) \qquad \text{Equation 4}$$

Here, an example is described in which a distance between the initiator 100 and the responder 200 is estimated once. Alternatively, as another example, a distance between the initiator 100 and the responder 200 may be estimated multiple times, the average of the estimated distances may be used or filtering processing may be performed on the estimated distances, and thereby, a more accurate distance may be estimated.

In step S250, the location estimator 110 of the initiator 100 receives location information of the initiator 100. For example, the location estimator 110 of the initiator 100 may recognize a location of the initiator 100 by using Global Positioning System (GPS) information or an Access Point (AP). In step S260, the location estimator 110 of the initiator 100 may estimate a location of the responder 200, with a resolution of several centimeters on the basis of the location information of the initiator 100.

Figure 14A:
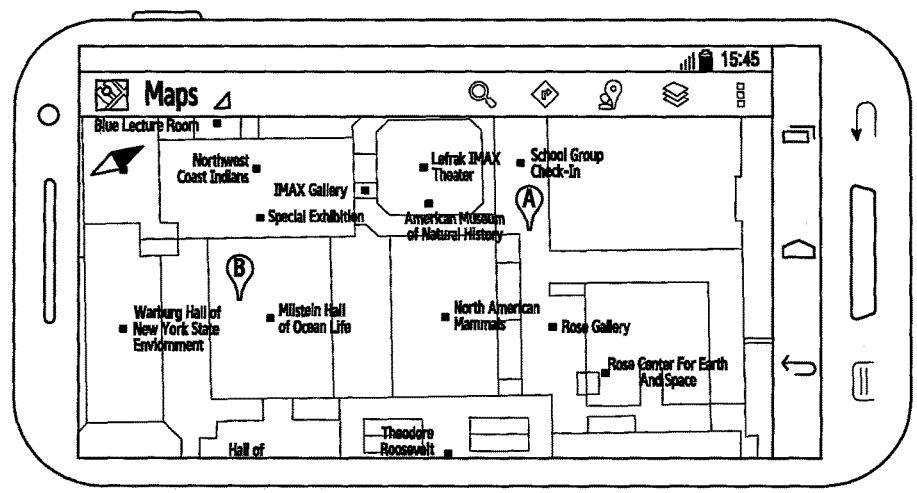
FIGS. 14A and 14B are views illustrating examples of displaying the estimated location of a second wireless device in a map according to embodiments of the present invention.
Figure 14B:
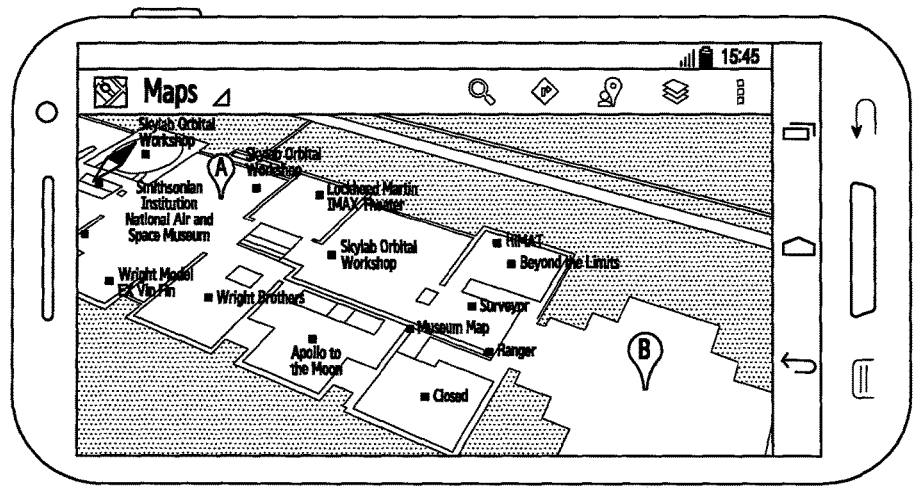

The location of the responder 200, that the initiator 100 has estimated as described above, may be externally displayed to enable a user to identify the estimated location of the responder 200. For example, the location of the initiator 100 and the location of the responder 200 may be displayed on a map as illustrated in FIGS. 14A and 14B below.

Also, the initiator 100 may perform a handover and a signal power adjustment operation on the basis of the estimated location of the responder 200. For example, the initiator 100 has a high probability of performing smooth communication with smaller signal power as a distance becomes shorter. Accordingly, the initiator 100 may adjust signal power by using a relation formula between a distance and signal power and by using this property. As another example, the initiator 100 may compare a location of the wireless device with locations of base stations, and may use a result of the comparison for a handover so as to communicate with a base station located in a nearby place.

Figure 13:
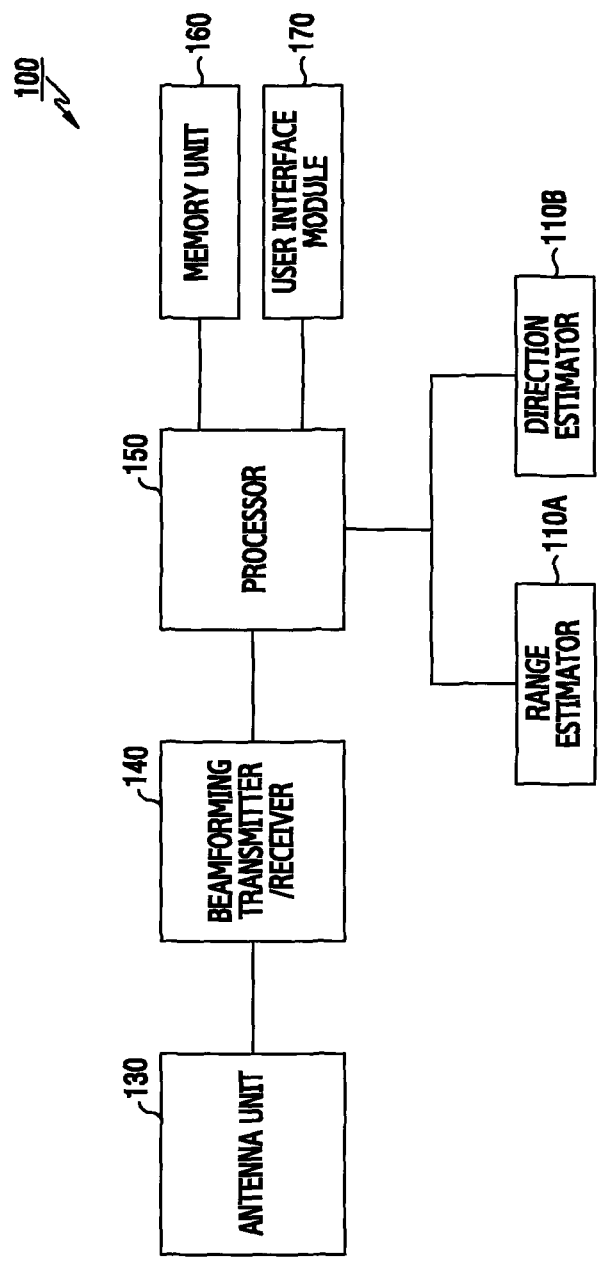
FIG. 13 is a block diagram of a first wireless device for a location estimation operation according to embodiments of the present invention.

FIG. 13 is a block diagram illustrating a configuration of a first wireless device for a location estimation operation according to embodiments of the present invention. The configuration illustrated in FIG. 13, which is only an example for describing the present invention, may be replaced by various modified configurations, and thus should not be construed as limiting the protection scope of the present invention. The configuration is an exemplified configuration of the first wireless device 100 illustrated in FIGS. 1 and 2, does not limit the scope of the present invention, and may use a similar configuration without departing from the scope of the present invention.

Referring to FIG. 13, the first wireless device 100 includes an antenna unit 130, a beamforming transmitter/receiver 140, a processor 150, a memory unit 160, a user interface module 170, a range estimator 110A, and a direction estimator 110B. The processor 150, the range estimator 110A, and the direction estimator 110B may configure the location estimator 110 illustrated in FIG. 1.

The antenna unit 130 includes multiple antenna arrays, and takes charge of transmission/reception of a signal. For example, the antenna unit 130 transmits/receives a signal in a band of 60 GHz by using mmWave technology. The beamforming transmitter/receiver 140 forms one or more beams, and serves to transmit/receive a signal through the formed beam. For example, the beamforming transmitter/receiver 140 may include an encoder, a modulator, a demultiplexer, a beamformer, a beamforming vector former, an Orthogonal Frequency Division Multiplexing (OFDM) modulator, a Radio frequency (RF) processor, and the like.

The processor 150 controls an overall operation of the wireless device. Particularly, the processor 150 controls the range estimator 110A and the direction estimator 110B, and performs a distance estimation operation and a direction estimation operation according to embodiments of the present invention. For example, the processor 150 of the initiator 100 estimates a direction and a distance of the responder 200 according to the flow illustrated in FIG. 12, and thereby estimates a location of the responder 200. Also, the processor 150 may perform an operation of detecting a location of the initiator 100 by receiving location information of the initiator 100 by using GPS information or an AP, and an operation of displaying the estimated location of the responder 200 on the user interface module 170 by using a map and the like on the basis of the detected location of the initiator 100. The GPS information may be received through a GPS receiver (not illustrated), and communication with the AP may be performed through the antenna unit 130. Also, the processor 150 may perform a handover operation or an operation of adjusting power of a signal by using a result of the location estimation.

The memory unit 160 stores a program for executing an operation of the wireless device, data according to the execution of the operation, and the like. Also, the memory unit 160 stores map information used during the display of the result of the location estimation according to embodiments of the present invention. The user interface module 170 is for an interface between the wireless device and the user, and may include an input module and a display module. The display module may display the result of the location estimation according to embodiments of the present invention together with a map. Through the display of the result of the location estimation, the user may identify the location of the first wireless device 100 and that of the second wireless device 200.

The range estimator 110A estimates distances of nearby wireless devices according to embodiments of the present invention. For example, the range estimator 110A may estimate a distance of the responder 200 according to the flows illustrated in FIGS. 4A to 9C. The direction estimator 110B estimates directions of nearby wireless devices according to embodiments of the present invention. For example, the direction estimator 110B may estimate a direction of the responder 200 according to the flows illustrated in FIGS. 10 and 11.

The above-described embodiments of the present invention are implemented by using signals, which necessarily need to exist in an existing modem, in order to minimize the power consumption of the range estimator 110A and that of the range estimator 210A. A signal which controls Tx of the baseband processor is used to find a time point of transmission of a range packet through the DAC, and adjustment is performed through various offsets.

Meanwhile, distributions of CIR peak values which are obtained during a distance estimation operation according to embodiments of the present invention may be distinguished from each other according to whether a multipath channel is a LOS channel or a Non-LOS (NLOS) channel. Accordingly, when the initiator for distance measurement receives a response range packet, the initiator may compare a CIR peak value with a particular threshold, and thereby, may represent the CIR peak value so as to be distinguished according to the LOS channel and the NLOS channel, or may represent a reliability on the distance estimated from the CIR peak value. From this result, the user can know the inaccuracy of distance measurement which may occur due to an effect of the multipath channel.

As described above, embodiments of the present invention enable distance estimation having a resolution of several centimeters by using the transmission and reception of signals between wireless devices in a wireless communication system. The embodiments of the present invention enable the estimation of the location of a wireless device on the basis of the estimated distance, and enable the adjustment of a handover between wireless devices and power of signals transmitted and received therebetween by using the estimated location information. Also, the embodiments of the present invention enable a distance between wireless devices to be rapidly estimated by using a request/response range packet. Also, the embodiments of the present invention enable the inaccuracy (reliability) of distance measurement, which may occur due to an effect of a multipath channel, to be provided to a user. Further, the embodiments of the present invention enable the power consumption of the range estimator to be minimized by using signals used in an existing modem.

Although the present invention has been described with reference to the limited embodiments and the drawings as described above, the present invention is not limited to the above-described embodiments, and various modifications and changes in form may be made to the embodiments described herein by those having ordinary knowledge in the technical field to which the present invention pertains. As an example, a case has been described in which, in embodiments of the present invention, the wireless device is configured as illustrated in FIGS. 2 and 3, operates according to the flows illustrated in FIGS. 4A, 4B, 4C, and 4D, and the range estimator of the wireless device measures a distance according to the flows illustrated in FIGS. 8A and 8B. However, the protection scope of the present invention will not be limited thereto.

Operations according to an embodiment of the present invention may be implemented by a single controller. In this case, a program instruction for performing an operation implemented by various computers may be recorded in a computer-readable medium. The computer readable medium may include a program command, a data file, a data structure, and the like independently or in combination. The program command may be things specially designed and configured for the present invention, or things that are well known to and can be used by those skilled in the related art. For example, the computer readable recoding medium includes magnetic media such as a hard disk, a floppy disk, and a magnetic tape, optical media such as a CD-ROM and a DVD, magneto-optical media such as a floptical disk, and hardware devices such as a ROM, RAM, and a flash memory, which are specially constructed in such a manner that they can store and execute a program command. Examples of the program command include a machine language code generated by a compiler and a high-level language code executable by a computer through an interpreter and the like. When the whole or part of the base station or the relay described in the present invention is implemented in a computer program, a computer-readable recording medium, that stores the computer program, is included in the present invention. Therefore, the scope of the present invention should not be defined as being limited to the described embodiments, but should be defined by the appended claims and equivalents thereof.

What is claimed is:

1. An apparatus of a first wireless device in a wireless communication system, the apparatus comprising:
   a transceiver configured to:
   transmit, to a second wireless device, first range capability information of the first wireless device,
   receive, from the second wireless device, second range capability information of the second wireless device, and
   if the first range capability information indicates that the first wireless device is capable of transmitting a null data packet and the second range capability information indicates that the second wireless device is capable of receiving the null data packet, transmit the null data packet as a request range packet to the second wireless device, and receive a response range packet from the second wireless device; and
   at least one processor configured to:
   estimate a location of the second wireless device based on a processing delay for the null data packet and the response range packet, and
   estimate a distance between the first wireless device and the second wireless device based on a first time difference between a time point of transmission of the null data packet and a time point of detection of reception of the response range packet, and a second time difference between a time point of detection of reception of the null data packet and a time point of transmission of the response range packet.

2. The apparatus of claim 1, wherein the at least one processor is further configured to estimate a direction of the second wireless device.

3. The apparatus of claim 1, wherein the at least one processor is configured to estimate the location of the second wireless device further based on a transmit circuit delay, and a receive circuit delay for estimating detection of reception of a range packet in each of the first wireless device and the second wireless device.

4. The apparatus of claim 3, wherein the at least one processor is further configured to estimate the distance between the first wireless device and the second wireless device further based on a predefined sample timing offset.

5. The apparatus of claim 3, wherein the transmit circuit delay in each of the first wireless device and the second wireless device includes a delay between a digital to analog converter and an antenna included in a transmitter of each of the first wireless device and the second wireless device, and the receive circuit delay in each of the first wireless device and the second wireless device includes a delay between an antenna and an analog to digital converter included in a receiver of each of the first wireless device and the second wireless device.

6. The apparatus of claim 1, wherein the null data packet includes a data packet which enables the second wireless device to transmit the response range packet.

7. The apparatus of claim 6, wherein each of the null data packet and the response range packet further includes a range field indicating whether a packet is a range packet.

8. The apparatus of claim 1, wherein the first or the second range capability information further indicates:
   whether the first or the second wireless device is capable of operating as an initiator requesting distance measurement;
   whether the first or the second wireless device is capable of operating as a responder responding to a distance measurement request;
   whether the first or the second wireless device is capable of using a range feedback request frame;
   whether the first or the second wireless device is capable of using a range feedback response frame; and
   a range capability information field representing an expected accuracy of distance measurement.

9. The apparatus of claim 1, wherein the at least one processor further configured to perform an operation of receiving location information of the first wireless device, and displaying, on a map, a location of the first wireless device and the location of the second wireless device.

10. The apparatus of claim 1,
    wherein the transceiver is further configured to:
    transmit a request signal for estimating a direction of the second wireless device, and
    receive a response signal in response to the request signal, and
    wherein the at least one processor is further configured to:
    estimate the direction of the second wireless device based on a signal strength of the response signal, and
    wherein the location of the second wireless device is estimated further based on the estimated direction of the second wireless device.

11. A method for operating a first wireless device in a wireless communication system, the method comprising:

transmitting, to a second wireless device, first range capability information of the first wireless device;

receiving, from the second wireless device, second range capability information of the second wireless device;

if the first range capability information indicates that the first wireless device is capable of transmitting a null data packet and the second range capability information indicates that the second wireless device is capable of receiving the null data packet, transmitting the null data packet as a request range packet to the second wireless device, and receiving a response range packet from the second wireless device, by a transceiver; and estimating a location of the second wireless device based on a processing delay for the null data packet and the response range packet, wherein the estimating of the location of the second wireless device comprises estimating a distance between the first wireless device and the second wireless device based on a first time difference between a time point of transmission of the null data packet and a time point of detection of reception of the response range packet, and a second time difference between a time point of detection of reception of the null data packet and a time point of transmission of the response range packet.

12. The method of claim 11, wherein the estimating of the location of the second wireless device comprises estimating a direction of the second wireless device.

13. The method of claim 11, wherein the estimating of the location of the second wireless device comprises estimating the location of the second wireless device further based on a transmit circuit delay, and a receive circuit delay for estimating detection of reception of a range packet in each of the first wireless device and the second wireless device.

14. The method of claim 13, the estimating of the distance between the first wireless device and the second wireless device comprises estimating a distance between the first wireless device and the second wireless device further based on a predefined sample timing offset.

15. The method of claim 13, wherein the transmit circuit delay in each of the first wireless device and the second wireless device includes a delay between a digital to analog converter and an antenna included in a transmitter of each of the first wireless device and the second wireless device, and the receive circuit delay in each of the first wireless device and the second wireless device includes a delay between an antenna and an analog to digital converter included in a receiver of each of the first wireless device and the second wireless device.

16. The method of claim 11, wherein the null data packet includes a data packet which enables the second wireless device to transmit the response range packet.

17. The method of claim 16, wherein each of the null data packet and the response range packet further includes a range field indicating whether a packet is a range packet.

18. The method of claim 11, wherein the first of the second range capability information further indicates:

whether the first of the second wireless device is capable of operating as an initiator requesting distance measurement;

whether the first of the second wireless device is capable of operating as a responder responding to a distance measurement request;

whether the first or the second wireless device is capable of using a range feedback request frame;

whether the first or the second wireless device is capable of using a range feedback response frame; and a range capability information field representing an expected accuracy of distance measurement.

19. The method of claim 11, wherein the estimating of the location of the second wireless device further comprising:

receiving location information of the first wireless device; and displaying, on a map, a location of the first wireless device and the location of the second wireless device.

20. The method of claim 11, further comprising:

transmitting a request signal for estimating a direction of the second wireless device;

receiving a response signal in response to the request signal; and estimating the direction of the second wireless device based on a signal strength of the response signal;

wherein the location of the second wireless device is estimated further based on the estimated direction of the second wireless device.

* * * * *